United States Patent
Yagi et al.

(10) Patent No.: US 7,489,673 B2
(45) Date of Patent: Feb. 10, 2009

(54) WIRELESS COMMUNICATION SYSTEM AND COMMUNICATION METHOD

(75) Inventors: Shigeki Yagi, Ogori (JP); Tetsuya Ashizuka, Dazaihu (JP); Toshiyuki Sugitani, Miyaki-gun (JP); Takatsugu Ito, Chikushino (JP); Shinji Fukuda, Fukuoka (JP); Yoshihiro Takehisa, Fukuoka (JP)

(73) Assignee: Panasonic Corporation, Osaka (JP)

( * ) Notice: Subject to any disclaimer, the term of this patent is extended or adjusted under 35 U.S.C. 154(b) by 900 days.

(21) Appl. No.: 10/887,896

(22) Filed: Jul. 12, 2004

(65) Prior Publication Data

US 2005/0007987 A1 Jan. 13, 2005

(30) Foreign Application Priority Data

| Jul. 10, 2003 | (JP) | 2003-195055 |
| Jul. 10, 2003 | (JP) | 2003-195056 |
| Jul. 10, 2003 | (JP) | 2003-195058 |

(51) Int. Cl.
*H04B 7/212* (2006.01)
(52) U.S. Cl. .................... 370/347; 455/447
(58) Field of Classification Search ........... 370/329, 370/352, 336, 347; 455/447, 502
See application file for complete search history.

(56) References Cited

U.S. PATENT DOCUMENTS 5,544,075 A 8/1996 Janex

FOREIGN PATENT DOCUMENTS

| EP | 1248479 | 10/2002 |
| EP | 1465448 | 10/2004 |
| JP | 728248 | 3/1995 |
| JP | 07107010 | 4/1995 |
| WO | 0137463 | 5/2001 |

OTHER PUBLICATIONS

International Search Report and Written Opinion dated Jan. 27, 2005.

*Primary Examiner*—Sam Bhattacharya
(74) *Attorney, Agent, or Firm*—Dickinson Wright, PLLC

(57) ABSTRACT

In a time division multiplex access (TDMA-TDD) type wireless communication system in which a communication operation is carried out between a first communication apparatus (mother appliance) and a second communication apparatus (child appliance), and since a slot diversity mode is selected while considering power consumption on the side of the second communication apparatus, the wireless communication system performs such a wireless communication having a higher wireless quality. Based upon a power supply remaining energy capacity on the side of the second communication apparatus, and an electromagnetic wave environment when a wireless signal is received, a slot diversity mode is selected. For example, it is so assumed that 1 frame corresponds to 8 slots, a wireless signal is transmitted from the first communication apparatus to the second communication apparatus by employing two, or more slots, whereas a wireless signal is transmitted from the second communication apparatus to the first communication by employing one slot within the remaining 2 to 6 (8-2) pieces of the slots. As a result, since a total number of the wireless transmission slots used in the second communication apparatus is reduced, transmission electric power can be lowered which may occupy a large ratio within the entire power consumption.

16 Claims, 12 Drawing Sheets

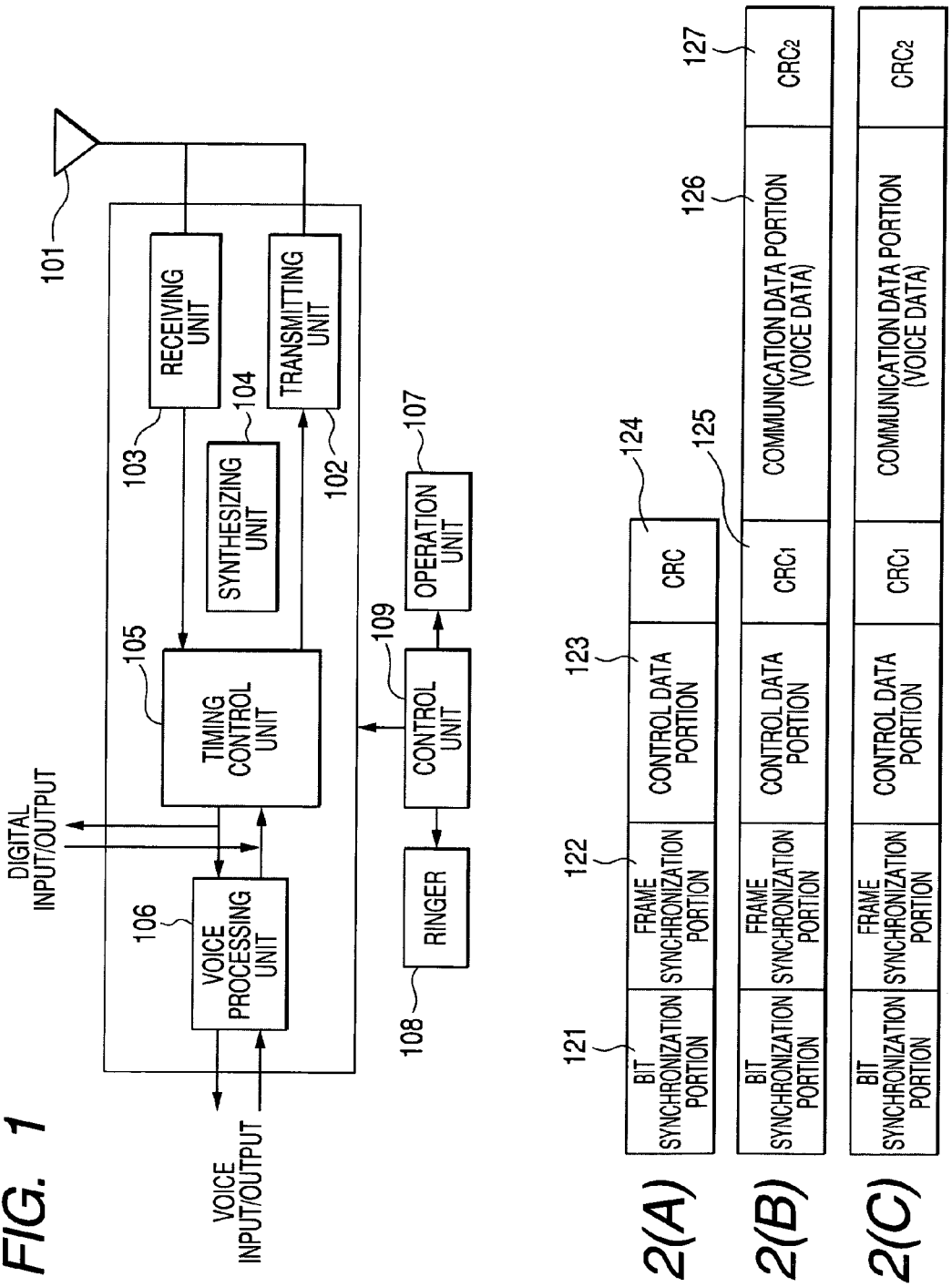

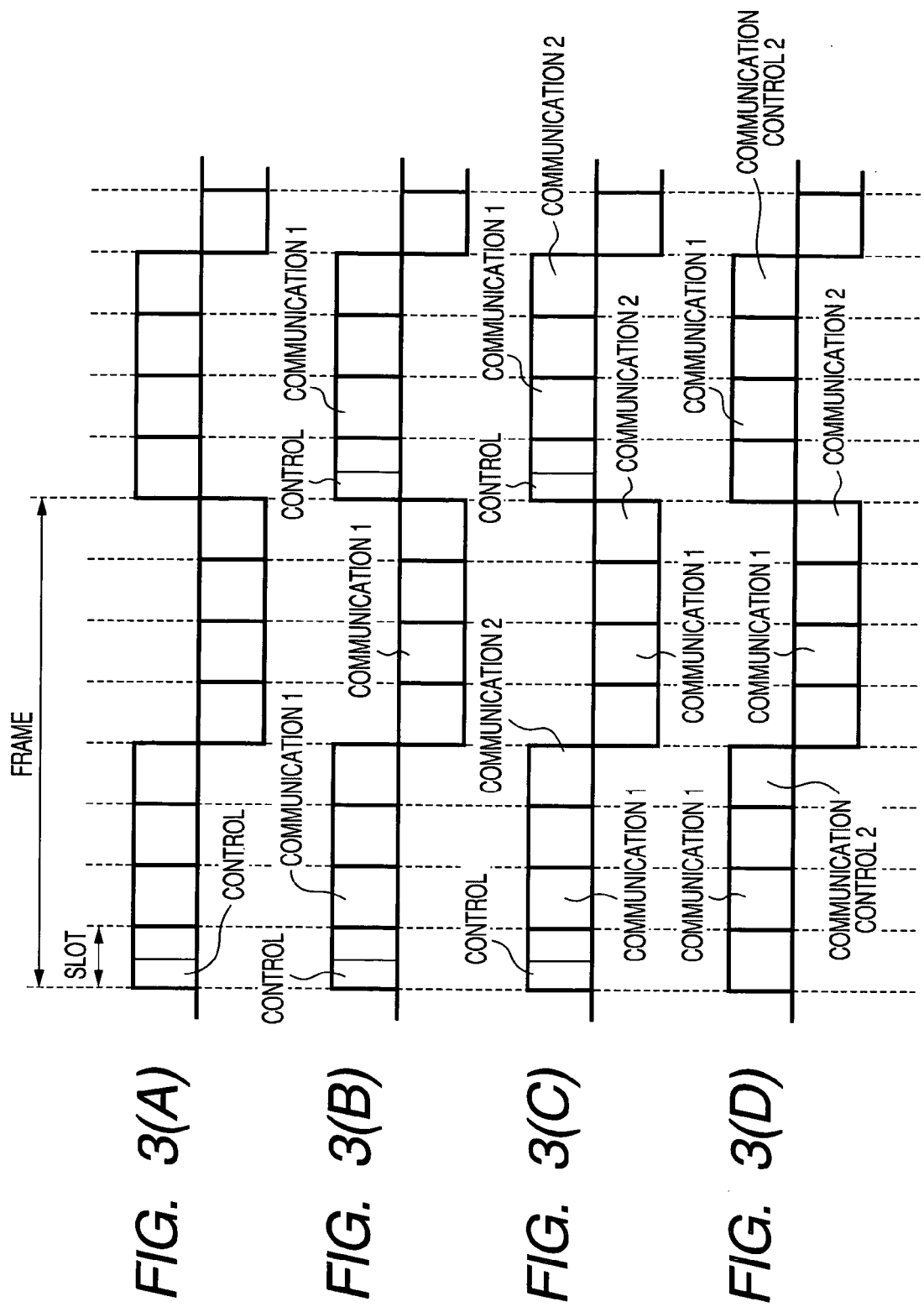

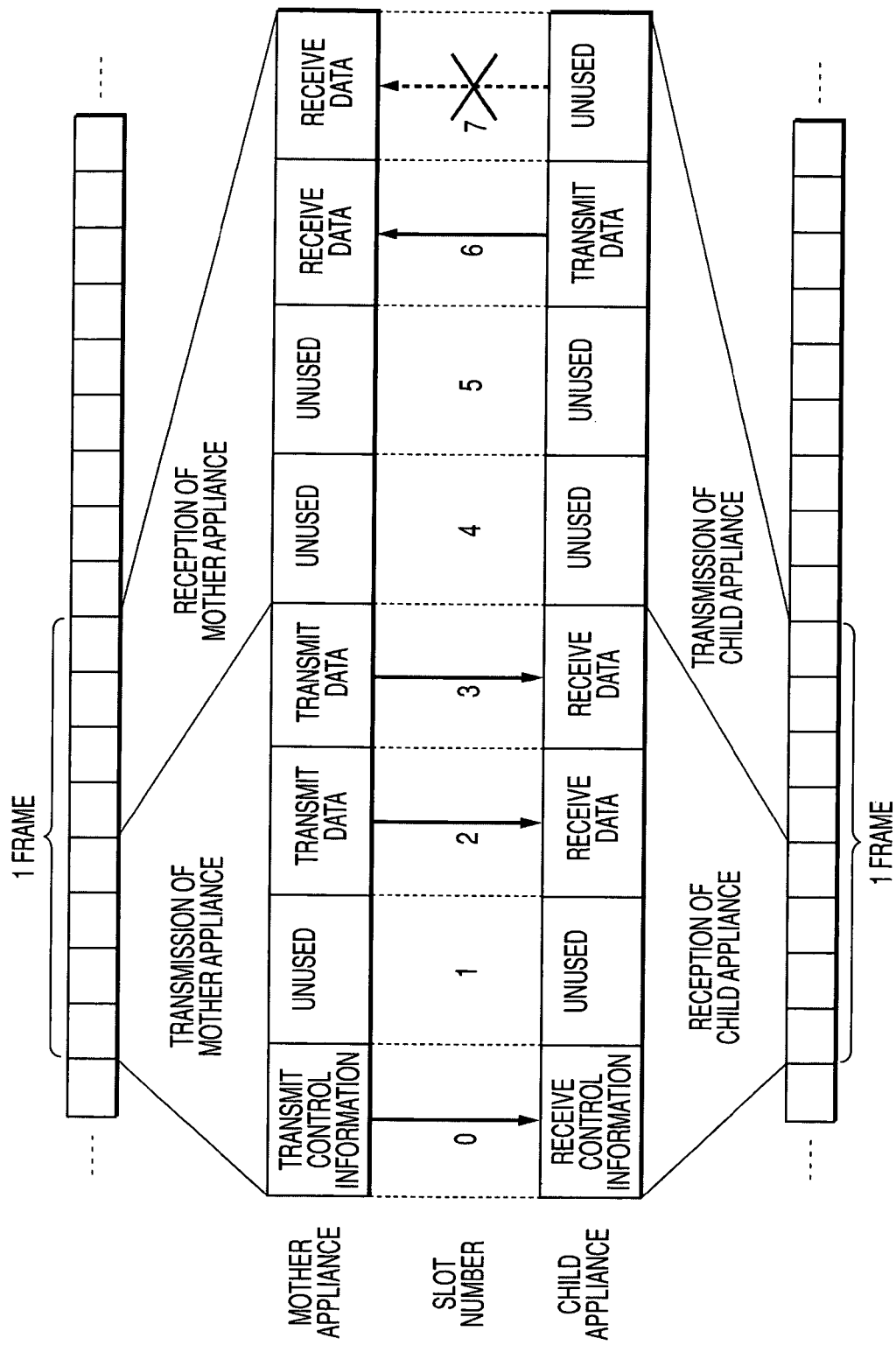

WIRELESS COMMUNICATION SYSTEM AND COMMUNICATION METHOD

BACKGROUND OF THE INVENTION

1. Field of the Invention

The present invention is related to a wireless communication system and a communication method, which are adaptable to slot diversity in order to improve wireless communication qualities in the TDMA-TDD system.

2. Description of the Related Art

Very recently, among wireless telephone apparatus for communicating voice signals in wireless manners, TDMA-TDD (time division multiplex access) type digital communication systems such as DECT system and PHS system have gradually constituted a major wireless telephone system from analog communication systems. In this TDMA-TDD system, for instance, while a frame having a constant time is equally subdivided into "N" pieces of slots (time slots), both a transmission signal and a reception signal are multiplexed in each of equally-divided time slots, and then, a multiplex communication operation is carried out between a mother appliance and a child appliance in a digital telephone system.

Also, in the IMS band, TDMA-TDD type communication apparatus have been developed and are operable in such a frequency hopping system for performing a communication operation while frequencies to be used are sequentially changed.

Preventing a deterioration of communication qualities, which is caused by wireless interference during wireless communications, may constitute an important aspect. Generally speaking, TDMA type communication apparatus using the frequency hopping system employ a so-called "channel swapping method" capable of suppressing an error occurrence caused by wireless interference. In the above-described channel swapping method, a portion of channels usable in a communication operation is set as a replace-purpose reserve channel, and then, a wireless communication is carried out under better wireless condition while the channels (frequencies) other than the reserve channel are switched in a predetermined sequence. When a wireless quality of a channel under use is deteriorated, such a notification that this deteriorated communication channel is replaced by the reserve channel is made with respect to a communication counter party, and the communication operation is continued.

On the other hand, Japanese Patent Publication No. Hei-7-28248 discloses the frequency diversity in the time division wireless communication system. That is, in this frequency diversity system, as to such a communication system (namely, frequency hopping system) that a plurality of frequencies are employed and communication operation is carried out while the frequencies are switched every slot within 1 frame, all of signals of the respective slots within 1 frame are made equal to each other, and the same signals are transmitted by changing the carrier frequencies in a temporal aspect. It should be noted that one of times which are segmented within 1 frame is refereed to as a "slot." Also, this disclosed technique may also be referred to as a "slot diversity technique", because not only the frequencies are changed, but also the same signals are transmitted by employing a plurality of slots within 1 frame.

On the other hand, in a wireless communication system which is arranged by a mother appliance operated by a commercial power supply and a child appliance which is connected to this mother appliance in a wireless manner and is driven by a battery, when a slot diversity control operation is carried, since large power consumption is required, there is such a problem that a portability of the child appliance is deteriorated due to lowering of communication time. In the above-explained slot diversity control operation, in order to improve a wireless communication quality, wireless signals which have been modulated by the same transmission data are transmitted in two, or more slots within the same frame from one communication apparatus, whereas the other communication apparatus receives the wireless signals of these plural slots, and then reproduces such a wireless signal having a better communication quality. Also, even under better electromagnetic wave environment, since the above-explained slot diversity control operation is carried out, unnecessary electric power is consumed.

SUMMARY OF THE INVENTION

The present invention has been made to solve the above-explained conventional problems, and therefore, has an object to provide such a wireless communication system capable of improving a wireless quality by employing a slot diversity control. First invention is featured by that in a time division multiplex access (TDMA-TDD) type wireless communication system in which a frame having a predetermined constant time is equally subdivided into a plurality of slots, both a transmission signal and a reception signal are multiplexed in each of these slots, and then, a communication operation is carried out between a first communication apparatus and a second communication apparatus, the same transmission data are transmitted by using two slots when the transmission data are transmitted from the first communication apparatus to the second communication apparatus; and transmission data is transmitted by using one slot when the transmission data is transmitted from the second communication apparatus to the first communication apparatus. Also, in the TDMA-TDD system in which 1 frame has been subdivided into "N" slots, the transmission data are transmitted by using "B" (larger than, or equal 2) pieces of slots from the first communication apparatus to the second communication apparatus, whereas the transmission data is transmitted by employing one slot selected from the remaining 2 to "P(N−B)" pieces of slots from the second communication apparatus to the first communication apparatus. As a consequence, since a total number of the wireless transmission slots used in the second communication apparatus is reduced, the transmission electric power can be reduced which occupies a large ratio within entire power consumption.

Alternatively, since the transmission data is transmitted by employing "Pa" ("Pa" is smaller than "B") of slots within the above-described 2 to P(N−B) pieces of slots from the second communication apparatus to the first communication apparatus, electric power consumption in this second communication apparatus may be reduced.

BRIEF DESCRIPTION OF THE DRAWINGS

FIG. 1 is a block diagram for indicating a communication apparatus which constitutes a wireless communication system according to an embodiment mode 1 of the present invention.

FIG. 2 represents a format diagram of a data format employed in the wireless communication apparatus of FIG. 1.

FIG. 3 is an explanatory diagram for explaining a slot construction used in the wireless communication apparatus.

FIG. 10 is a diagram for indicating an example of slot diversity operation.

DESCRIPTION OF THE PREFERRED EMBODIMENTS

EMBODIMENT MODE 1

Figure 4:
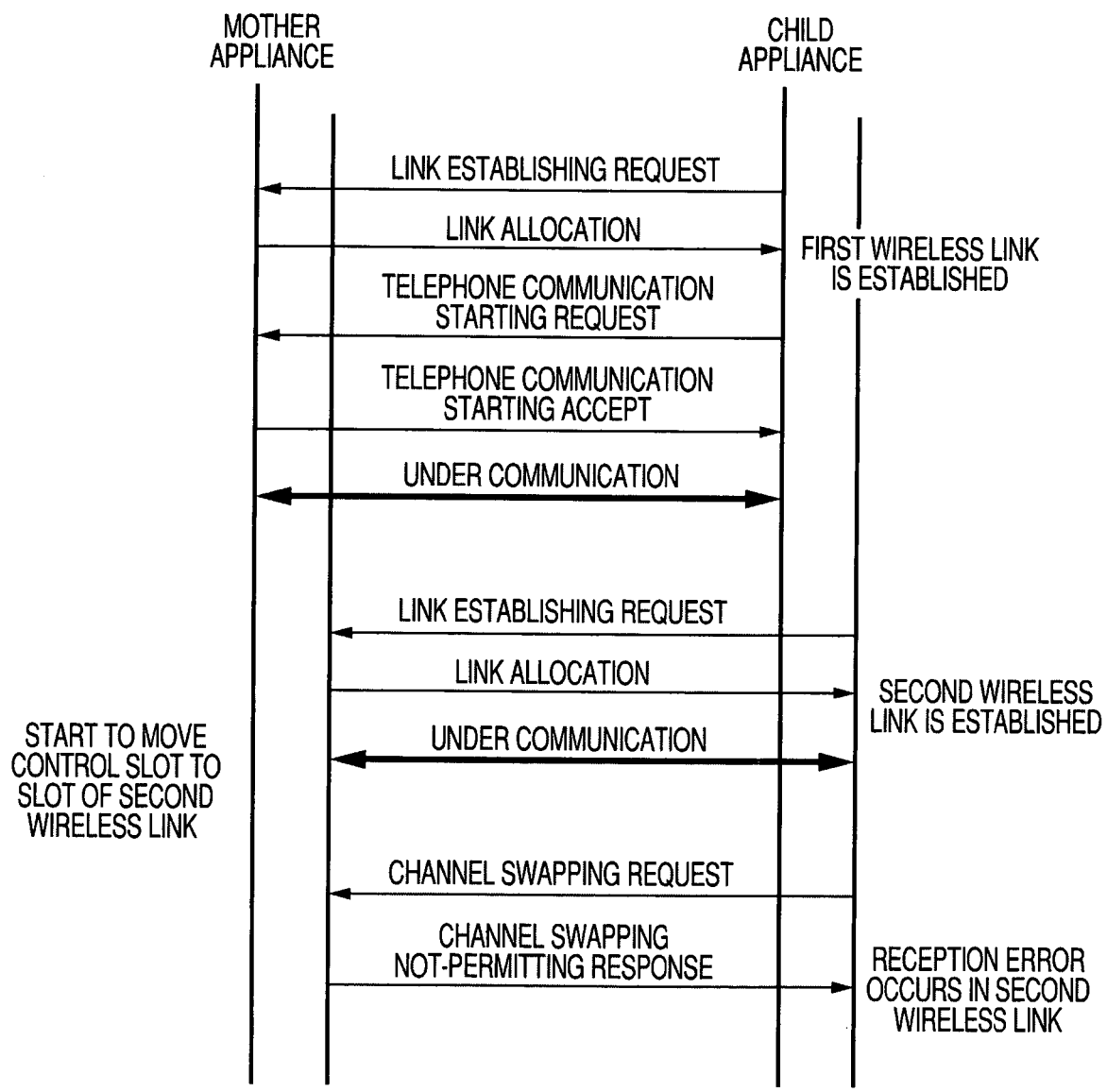
FIG. 4 is a sequence diagram for establishing two wireless links during a communication operation of the wireless communication apparatus.

FIG. 1 is a schematic block diagram for indicating an arrangement of a wireless communication apparatus which constitutes the wireless communication system of the present invention, as an embodiment mode 1. Referring now to FIG. 1, operations of the wireless communication apparatus will be explained.

As shown in FIG. 1, this wireless communication apparatus is provided with an antenna 101, a transmitting unit 102, a receiving unit 103, a synthesizing unit 104, and a timing control unit 105. The antenna 101 transmits and/or receives a wireless signal. The transmitting unit 102 converts a transmission signal which is inputted into a wireless signal. The receiving unit 103 demodulates a received wireless signal. The synthesizing unit 104 produces a wireless signal of a frequency hopping system, and also, generates a sine wave having a frequency which is required in a demodulating operation. The timing control unit 105 produces data structural timing of a frame slot for a time-division multiplexing operation.

This timing control unit 105 produces both timing of a frame which has been segmented every predetermined time, and timing of slots in which times have been segmented within one frame. Then, the timing control unit 105 performs a time-division multiplexing operation at these frame timing and slot timing.

Also, the wireless communication apparatus, shown in FIG. 1, is further equipped with a voice processing unit 106, an operation unit 107 such as a ten-numeral entry key, a ringer 108, and a control unit 109 for controlling an entire unit of the wireless communication apparatus. The voice processing unit 106 digitally converts an inputted voice signal into digital voice data, and analogously converts a received signal into an analog reception signal. The ringer 108 notifies a telephone calling reception, and the like.

Next, a description is made of operations of the wireless communication system according to this embodiment mode 1. A voice signal which is inputted to the wireless communication system is converted into a digital voice signal by the voice processing unit 106, and then, the digital voice signal is supplied to the timing control unit 105. In the timing control unit 105, the synchronization signals required in the TDMA (Time Division Multiple Access) communication, and the CRC (Cyclic Redundancy Check) 124 codes required in the error detection are added to the digital voice signal, and then, the resulting voice signal is outputted at timing designated by the frame of the TDMA communication.

The following explanation is made of such a system case that while a plurality of wireless links are established by a single communication operation, signals of such wireless links that reception signals are obtained under better conditions are selected. It should be understood that an example where two wireless links are utilized will be explained.

In this case, the timing control unit 105 adds the synchronization signal required in the TDMA communication and the CRC code required in the error detection to the digitally-processed voice signal, and then, outputs two slots (time slots) within a frame of the TDMA system. At this time, voice data of the respective (two) slots within one frame may be alternatively produced from signals of voice data within the same section (in this case, transmission data of two slots are identical to each other), and also, may be alternatively produced from signals of voice data within difference sections, for example, within sections in response to a difference between transmission timing. In the latter case, the transmission data of the two slots are not made equal to each other.

The (voice) data outputted from the timing control unit 105 is converted into a wireless signal by the transmitting unit 102 by employing the sine wave derived from the synthesizing unit 104, and thereafter, this wireless signal is outputted from the antenna 101. At this time, as to frequencies of sine waves outputted from the synthesizing unit 104, the frequencies are produced in a predetermined sequence in order to execute a communication operation of the frequency hopping system.

On the other hand, a signal received by the antenna 101 is demodulated by the receiving unit 103 by employing the sine wave derived from the synthesizing unit 104, and then, the demodulated signal is supplied to the timing control unit 105. At this time, as to frequencies of sine waves outputted from the synthesizing unit 104, the frequencies are produced in a predetermined sequence in order to execute a communication operation of the frequency hopping system.

Also, the timing producing unit 105 extracts a data portion of a voice signal from the demodulated data which is received from the receiving unit 103, and then, outputs the extracted data portion of the voice signal to the voice processing unit 106. In such a case that a communication operation is carried out by employing two slots, as to data which are received in the respective slots, superior reception data is selected based upon a CRC 124 error judgement, and then, the selected reception data is outputted to the voice processing unit 106. At this time, in the case that data of the same voice section are transmitted within a single frame, after the receiving operations for both of the data have been accomplished, any one of these data is outputted to the voice processing unit 106.

Also, in such a case that voice data are transmitted which are produced from different sections with employment of two slots, for instance, which are produced from voice data signals of sections in response to a difference in transmission timing (in this case, transmission data of two slots are not made equal to each other), reception data having no CRC error are sequentially sent to the voice processing unit 106. At this time, in the case that such a voice data portion is produced, which partially overlaps with a preceding reception slot and a reception slot subsequent to the first-mentioned reception slot, the overlapping portion within the voice data of the preceding reception slot is discarded. In the voice processing unit 106, the digital signal transmitted thereto is converted into an analog signal, and then, this analog signal is outputted.

In the case of a data transmission, a transmission signal is directly entered to the timing control unit 105, and the received signal is outputted from the timing control unit 105. It should also be noted that with respect to a wireless communication apparatus corresponding to the above-explained wireless communication apparatus of the present invention, for example, both an arrangement and an operation of a child appliance are similar to those of a mother appliance.

Next, as an application example of the wireless communication system of the present invention, a description is made of transmitting/receiving operations as to a control-purpose wireless signal in a cordless telephone constituted of both a mother appliance and a child appliance. For instance, in such a case that the wireless communication apparatus is operated as the mother appliance, the mother appliance normally outputs control-purpose data in a predetermined slot of the communication frame of the TDMA system in a periodic manner. In other words, the control unit 109 outputs the control-purpose data to the timing control unit 105 at predetermined timing. Such a slot used to transmit the control data will be referred to as a "control slot" hereinafter.

The timing control unit 105 adds both a synchronizing signal required in a communication operation and a CRC code required in an error detection to the control data, and then outputs the resulting data at such a timing designated by the communication frame of the TDMA system. In such a case that a voice signal is superimposed on a control slot in the cordless telephone constructed of the mother appliance and the child appliance, both the voice data sent from the voice processing unit 106 and the CRC code thereof are further added to the above-described control data, and then, the resulting data is outputted at such a timing designated in the transmission frame of the TDMA system.

The data outputted from the timing control unit 105 is converted into a wireless signal by employing the sine wave derived from the synthesizing unit 104 in the transmitting unit 102, and then, this wireless signal is outputted from the antenna 101. At this time, as to frequencies of sine waves outputted from the synthesizing unit 104, the frequencies are produced in a predetermined sequence for the control slot in order to carry out a communication operation of the frequency hopping system irrespective of such a fact that the voice data has been superimposed on the control slot.

In the cordless telephone corresponding to the application example of the present invention, when the communication apparatus shown in FIG. 1 performs a communication operation as the child appliance thereof, this child appliance receives the control channel which is transmitted in a periodic manner from the mother appliance thereof in order to establish synchronizations of both frames and slots of the TDMA system, or to establish a synchronization of hopping periods of the frequency hopping system. The control unit 109 controls the receiving unit 103, the synthesizing unit 104, and the timing control unit 105 in order to continuously receive one of the control-purpose communication frequencies. The control unit 109 executes a control operation in such a manner that at a time when the control signal transmitted from the mother appliance is received, one of the control-purpose communication frequency is received at such a timing adapted to the timing of the transmission slot of the control signal from the mother appliance from the continuous reception. At the same time, the control unit 109 executes a control operation of a reception frequency in such a manner that this reception frequency is sequentially changed in such a sequence which is adapted to the sequence of the frequency hopping for the control-purpose slot. Also, in such a case that a communication operation is carried out by using two slots containing one slot to which control information has been superimposed, the timing control unit 105 of the reception-sided communication apparatus separates the data of the slot to which the control information has been superimposed into the control information and other data (namely, if voice communication is carried out, then this data corresponds to voice data, which will be then processed).

FIG. 2 indicates a data format. FIG. 2(A) indicates a data format of a control slot which is constituted by a bit synchronization portion 121, a frame synchronization portion 122, a control data portion 123, and a CRC 124. FIG. 2(B) shows a data format of a communication-purpose slot which is constituted by a bit synchronization portion, a frame synchronization portion, a control data portion, a $CRC_1$ 125, a communication data portion 126, and a $CRC_2$ 127. In the case of a voice communication operation, voice data is transmitted by utilizing the communication data portion 126. Also, a control command required during communication operation, for example, an interrupt request and a frequency switching request is transmitted by using the control data portion. FIG. 3(C) represents a data format of a control slot in such a case that communication data is superimposed on the control slot. This data format is also constituted by a bit synchronization portion, a frame synchronization portion, a control data portion, a $CRC_1$, a communication data portion, and a $CRC_2$. Then, in the case of a voice communication operation, voice data to be superimposed is transmitted by using the communication data portion.

FIG. 3 indicates a slot construction. FIG. 3 represents an example of such a slot construction that 4 lots have been multiplexed in 1 frame in an up direction (transmission of child appliance) and a down direction (transmission of mother appliance), respectively. FIG. 3(A) shows such an example that the mother appliance transmits the control slots in a slot 1. FIG. 3(B) indicates such an example that while the mother appliance transmits control information in a slot 1, the mother appliance is communicated to the child appliance in one wireless link in a slot 2. FIG. 3(C) indicates such an example that while the mother appliance transmits a control slot in a slot 1, the mother appliance is communicated to the child appliance in two wireless links in a slot 2 and a slot 4. Also, FIG. 3(D) indicates such an example that while the mother appliance transmits control information in a slot 4, the mother appliance superimposes data in this slot 4, and further the mother appliance is communicated to the child appliance in two wireless links by employing the slot 2.

In the example of FIG. 3, first of all, a communication operation between the mother appliance and the child appliance is commenced; a first wireless link is established; a second wireless link is established; and then, the control slot is advanced to the slot of the second wireless link. The above-explained flow operation is indicated by (A)→(B)→(C)→(D).

TABLE 1

| FRAME | SLOT NUMBER | | | |
|---|---|---|---|---|
| NUMBER | SLOT 1 | SLOT 2 | SLOT 3 | SLOT 4 |
| FRAME 1 | f 1 | f 3 | f 5 | f 7 |
| FRAME 2 | f 2 | f 4 | f 6 | f 8 |
| FRAME 3 | f 3 | f 5 | f 7 | f 1 |
| FRAME 4 | f 4 | f 6 | f 8 | f 2 |
| FRAME 5 | f 5 | f 7 | f 1 | f 3 |
| FRAME 6 | f 6 | f 8 | f 2 | f 4 |
| FRAME 7 | f 7 | f 1 | f 3 | f 5 |
| FRAME 8 | f 8 | f 2 | f 4 | f 6 |
| RESERVE | f 9 | f 9 | f 9 | f 9 |
|  | f 10 | f 10 | f 10 | f 10 |

The table 1 shows an example as to a hopping frequency of a frequency hopping system. In this example, 8 sorts of frequencies "f1" to "f8" are sequentially used as a hopping frequency, and two sorts of frequencies "f9" and "f10" are prepared as a channel swapping operation. In this table 1, a longitudinal column shows frequencies which are used in the respective four slots in the case that a time-division multiplexing operation is carried out, whereas a lateral column indicates frequencies which are used in the same frame. In other words, when the frame number is 1, the frequency f1 is employed in the slot 1; the frequency f3 is employed in the slot 2; the frequency f5 is employed in the slot 3; and the frequency f7 is used in the slot 4. Similarly, when the frame number is 2, the frequency f2 is employed in the slot 1; the frequency f4 is employed in the slot 2; the frequency f6 is employed in the slot 3; and the frequency f8 is used in the slot 4. Also, when the frame number exceeds 8, this frame number is returned to 1 where the frequencies are determined.

In the case that the mother appliance transmits the above-explained control information, while the frequencies are switched from f1, f2, - - - f8 every frame, this mother appliance transmits the control information. Since the child appliance continuously receives a certain one frequency (namely, any one of 8 frequencies f1 to f8), the child appliance receives the control information of the mother appliance at such a timing when the control information of the mother appliance is transmitted at the same frequency, so that the child appliance can establish a synchronization of a hopping period. At this time, since such an information that the mother appliance transmits the control information in which slot is notified as a poriton of the control information, a synchronization of the slots may also be established.

In slots other than such a slot where the mother appliance transmits the control data, the mother appliance continuously receives at a reception frequency responding to the frequency of the table 1 in order to receive data transmitted from the child appliance. In other words, when the mother appliance transmits the control channel in the slot 1, in such a frame having the frame number 1, the mother appliance receives at the frequency of f3 in the slot 2; at the frequency of f5 in the slot 3; and at the frequency of ff7 in the slot 4. In the case that the child appliance sends a wireless link establishing request (will be discussed later) to the other appliance so as to establish a wireless link, after the child appliance has established a synchronization between a slot and a frequency by receiving a control slot, the child appliance performs a transmission at a frequency which is fitted to the reception frequency of the mother appliance in any slots other than the control slot.

Also, when both the mother appliance and the child appliance are brought into communication conditions, in such a case that a wireless condition is deteriorated at a certain frequency under use, this frequency is swapped by a reserved frequency. At this time, both the frequency before being swapped and the frequency after being swapped are notified to a communication counter party, and then, the frequency swapping operation is carried out after responses as to these frequencies have been received.

It should also be understood that the above-described frequency replacing (channel swapping) operation is not carried out also in such a case that only the control information is transmitted in the control-purpose slot, and also, in the case that the communication data is superimposed in addition to the control information while the communications are carried out in a plurality of wireless links.

FIG. 4 shows such a control sequence that while a mother appliance is communicated with a child appliance in a sequential operation for establishing two wireless links during a communication operation, in such a case that a plurality of wireless links are established, the plural wireless links are established in any slots other than a control slot, and the control slot is moved to slots of the established wireless links.

First, since the child appliance issues a link establishing request in a slot other than the control slot and accepts a link allocation issued from the mother appliance, the child appliance establishes a first wireless link, and commences a call control sequence for a telephone communication, namely, a telephone communication starting request and a telephone communication starting response on the first wireless link in an example of FIG. 4.

At the same time, the child appliance issues a link establishing request similar to such a case that the first wireless link is established in the control slot and in a slot other than such a slot which is used in the first wireless link. Then, since the child appliance accepts a link allocation issued from the mother appliance, the child appliance establishes a second wireless link. At this time, in the case that the second wireless link must be superimposed with the control slot, for instance, in such a case that a remaining communication capacity becomes small as shown in FIG. 4, as to the frequencies used in the second wireless link, the channel swapping is prohibited. This is because the second wireless link is superimposed on the control slot.

As indicated in FIG. 4, in the case that in the second wireless link on the side of the child appliance, a reception condition is deteriorated, the child appliance issues a channel swapping request in such a wireless link whose communication condition is deteriorated. Then, in the case that the mother appliance is trying to move the control information to a certain link in the relevant wireless link, or after the mother appliance has moved the control information to the certain slot, the mother appliance does not permit the channel swapping request as to such a slot to which this control information is scheduled to be superimposed (otherwise, to which this control information has been superimposed). The mother appliance returns a channel swapping not-permitted response with respect to the channel swapping request issued from the child appliance. As a consequence, in this wireless link, swapping of the frequency is prohibited.

In such a case that a control-purpose slot is moved to a slot which has been so far used for a communication purpose, after the second wireless link has been established, the mother appliance commences such an operation that the control slot is moved to a slot which is used in the second wireless link. At this time, since another child appliance cannot receive the control slot of the mother appliance, the child appliance again searches the control slot of the mother appliance so as to re-synchronize the control slot. Also, at this time, the mother appliance transmits the control information in both the old control slot and the multiplexed control slot to which the old control slot is moved for a constant time period. As a consequence, another child appliance which waits for the mother appliance can temporarily receive the control information both in the old control slot and the slot to which the old control slot has been moved, and thus, can readily follow the movement of the control slot of the mother appliance. During this time period, such a method may be carried out. That is, in the old control slot, the mother appliance moves the control slot and notifies the slot of the move destination, whereas another child appliance which is receiving the control channel moves the control slot in response to this notification.

Also, in the second wireless link, thereafter, a transmission operation only in any one of an up direction and a down direction may be stopped, or both the transmission and the reception may be alternatively stopped. In other words, in the second wireless link, since the second wireless link is established in order to perform the synchronization control, or under the same control as that for the initiating the first link, the communication of the dual direction is once carried out. However, after the wireless link has been established, the transmission of either the up direction or the down direction is stopped. Otherwise, the transmission and reception operations are stopped. At this time, in the second wireless link, since such a condition has been previously determined in which one of the wireless channels is stopped after the wireless links have been established, even when the receiving operation on the stopped link side cannot be carried out, a process operation executed when the reception error occurs is not uselessly initiated. For example, a channel swapping operation and/or a slot switching operation are not uselessly initiated.

Figure 5:
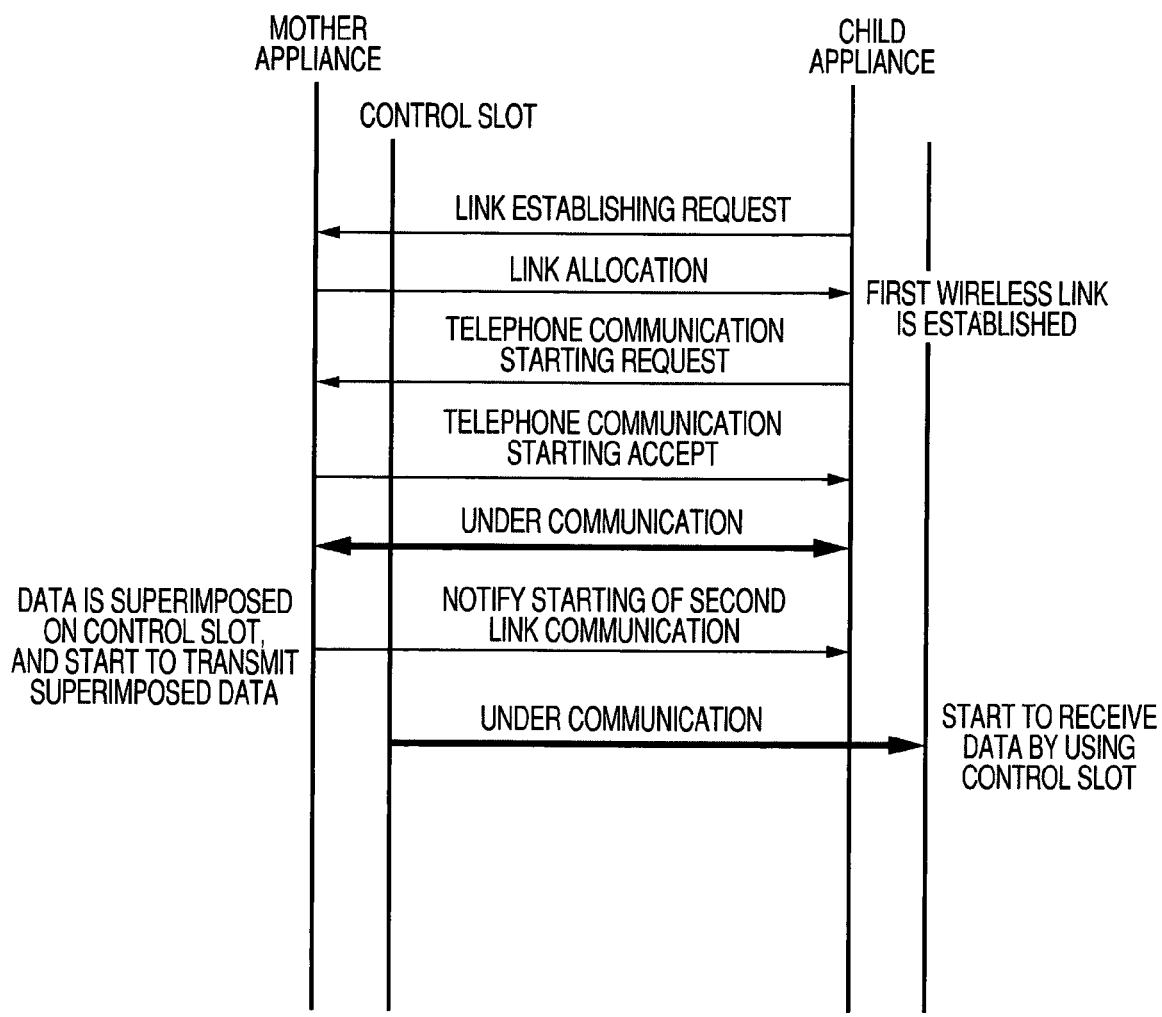
FIG. 5 is another sequence diagram for establishing two wireless links during the communication operation of the wireless communication apparatus.

FIG. 5 shows an example of a sequential operation in which after the mother appliance has established a first wireless link in such a sequential operation for establishing two wireless links during a communication operation, the mother appliance transmits a communication signal (either voice signal or image signal) to the child appliance by superimposing this communication signal on a control slot. First of all, since the child appliance issues a link establishing request in a slot other than the control slot and accepts a link allocation issued from the mother appliance, this child appliance establishes a first wireless link.

While the mother appliance uses the slot where the first wireless link has established, this mother appliance transmits such a message to the child appliance in order to notify that data is superimposed on the control slot. Upon receipt of this notification, the child appliance commences to receive the control slot, and commences to receive the data (namely, either voice data or image data) which has been superimposed on the control slot. In this case, while the wireless links are established by the two slots only in the down direction (mother appliance→child appliance), the communication may be alternatively maintained by keeping only one wireless link in the up direction (child appliance→mother appliance). For example, if such a transmission operation is carried out, namely, in the down direction (mother appliance child appliance), the same voice data are transmitted by using the two slots respectively, whereas in the up direction (child appliance→mother appliance), the voice data is transmitted by using one slot, then a sound quality of the voice data transmitted from the mother appliance to the child appliance may be increased, while error probability may be decreased. Also when the voice data is transmitted from the child appliance to the mother appliance, electric power can be saved. Alternatively, while a data transmission of the up direction is continuously commenced, two wireless links may be established in both the up direction and the down direction.

More specifically, in such a wireless communication system which is constituted by a mother appliance driven by a commercial power supply, and a child appliance which is driven by a battery and is connected to this mother appliance in a wireless manner, if such a transmission operation is carried out in which the same voice data are transmitted from the mother appliance to the child appliance by using two slots, whereas voice data is transmitted from the child appliance to the mother appliance by employing one slot, then the battery energy consumption of the child appliance may be suppressed, and further, the telephone conversation time may be prolonged.

Figure 6:
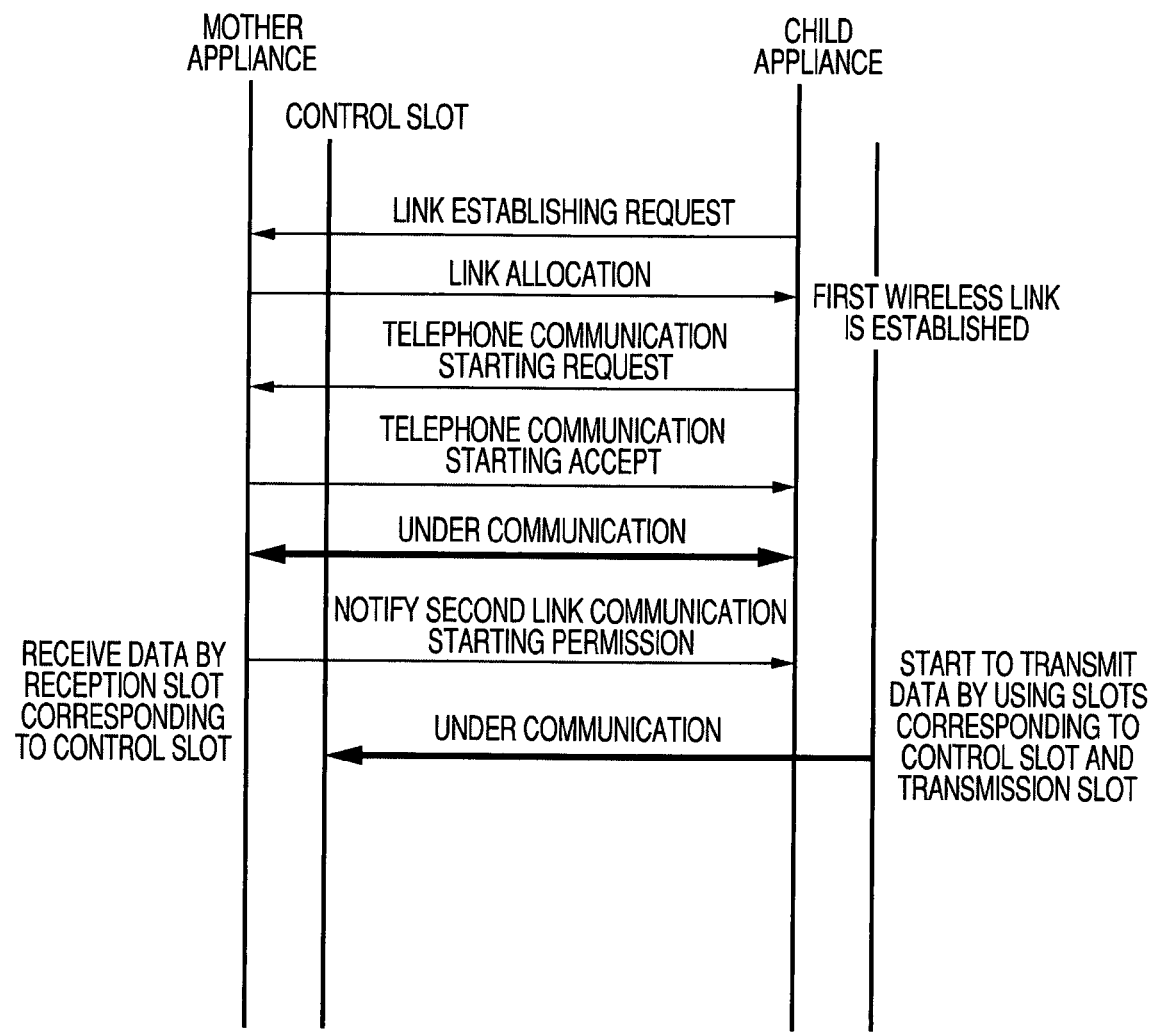
FIG. 6 is a sequence diagram for explaining notifications of permitting/not permitting wireless links between a mother appliance and a child appliance during the communication operation in the wireless communication apparatus.

FIG. 6 shows an example of a sequential operation in which after the child appliance has established a first wireless link in such a sequential operation for establishing two wireless links during a communication operation, the child appliance transmits a communication signal by using a transmission slot of the child appliance, which corresponds to such a slot in which the child appliance has received control information. First of all, since the child appliance issues a link establishing request in a slot other than the control slot and accepts a link allocation issued from the mother appliance, this child appliance establishes a first wireless link.

While the mother appliance employs the slot in which the first wireless link has been established, this mother appliance notifies such a message for permitting that communication data is superimposed on the control slot. Upon receipt of this notification, the child appliance commences a data transmitting operation in a transmission slot of the child appliance, which corresponds to a transmission slot of the control slot of the mother appliance, whereas the mother appliance commences to receive data of a second wireless link in a reception slot corresponding to the control slot. In this case, two wireless links may be established in two slots only in the up direction, and one wireless link may be maintained in the down direction. Alternatively, while communication data is subsequently superimposed on a control-purpose slot, a data transmission in the down direction may be commenced, and two wireless links may be established in both the up direction and the down direction.

Next, a description is made of such an operation that a plurality of wireless links are permitted, or not permitted by a control slot. An arrangement of an apparatus is similar to that shown in FIG. 1. While the wireless communication apparatus of the present invention is operated as a mother appliance, this wireless communication apparatus outputs control-purpose data in a periodic manner in a predetermined slot of a communication frame of the TDMA system. In other words, the control unit 109 outputs the control-purpose data to the timing control unit 105 at predetermined timing. The timing control unit 105 adds both a synchronizing signal required in a communication operation and a CRC code required in an error detection to the control data, and then outputs the resulting data at such a timing designated by the communication frame of the TDMA system.

At this time, such an information as to whether or not the relevant mother appliance permits a plurality of wireless links with respect to a single communication operation is superimposed on a portion of the control information which is transmitted from the mother appliance.

It should be understood that this information may be alternatively transmitted every time the control information is transmitted, or in a predetermined time interval. Alternatively, this information may be transmitted at least one time in such a case that the condition of the mother appliance is changed from the permission condition to the non-permission condition, or from the non-permission condition to the permission condition. Also, at this time, in such a case that a voice signal is superimposed on a control slot and the resulting voice signal is transmitted, both the voice data sent from the voice processing unit 106 and the CRC 124 code are further added to the above-explained data, and then, the resulting data is outputted at the designated timing in the frame of the TDMA system. The data outputted from the timing control unit 105 is converted into a wireless signal by employing the sine wave derived from the synthesizing unit 104 in the transmitting unit 102, and this wireless signal is outputted from the antenna 101.

Also, in the case that the wireless communication apparatus of the present invention is operated as a child appliance, this child appliance is required to receive a control channel which is transmitted by a mother appliance in a periodic manner. Since the child appliance receives the control channel which is transmitted in the periodic manner, either a frame synchronization or a slot synchronization of the TDMA system can be established. Otherwise, a hopping period synchronization of the frequency hopping system can be established. Also, since the child appliance receives the control channel, the child appliance can grasp as to whether or not the mother appliance permits a plurality of wireless links with respect to a single communication operation.

The control unit 109 of the wireless communication apparatus which is operated as the child appliance controls the receiving unit 103, the synthesizing unit 104, and the timing control unit 105 in such a manner that one of the control-purpose communication frequencies is continuously received. At such a time when the control signal transmitted from the mother appliance is received, the control unit 109 executes a control operation from the continuous receiving operation in such a manner that one of the control-purpose communication frequencies is received in accordance with such a timing of a transmission slot of the control signal sent from the mother appliance. At the same time, this control unit 109 sequentially changes frequencies of the receiving operation in accordance with the sequence of the frequency hopping of the control-purpose slot.

In such a case that the information as to whether or not a plurality of wireless links are permitted with respect to one communication operation is contained in this control information, the child appliance which has received the control signal of the mother appliance in this manner stores this information in the control unit 109, and when a communication operation is carried out, this child appliance determines as to whether or not a plurality of wireless links are established based upon the stores information. Also, in the case that a communication operation is carried out in two slots containing a control slot, a reception signal in the control slot is separated by the timing control unit 105 into both the control information and another data, namely, voice data when a voice communication operation is carried out, which are processed. As previously explained, when the empty of the own wireless resource (slot) is larger than the threshold value, the mother appliance permits the child appliance to establish the multi-link in response to the multi-link permitting request issued from the child appliance.

Figure 7:
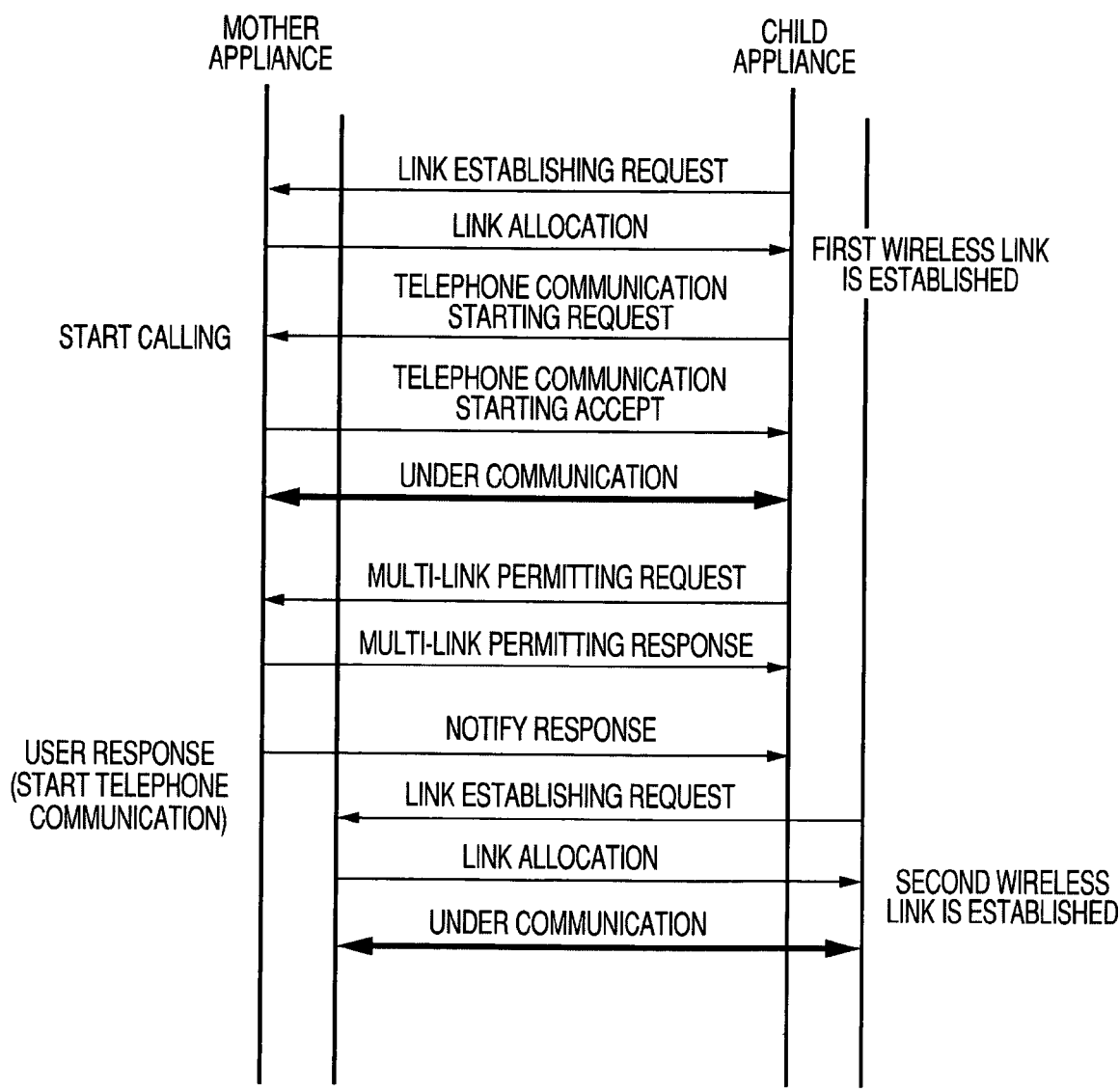
FIG. 7 is a sequence diagram for explaining notifications of permitting/not permitting wireless links between the mother appliance and the child appliance during registration operation.

Next, a description is made of such an operation that a plurality of wireless links are permitted, or not permitted during a communication operation. FIG. 7 indicates such an operation that a transmission operation is performed from the child appliance to the mother appliance, namely such an example that a plurality of wireless links are permitted. When the transmitting operation is carried out on the side of the child appliance, the child appliance issues a link allocation request, and since the child appliance accepts a link allocation from the mother appliance, a first wireless link of a dual direction is established. Subsequently, the child appliance issues a telephone communication starting request. When the mother appliance accordingly receives this telephone communication starting request, this mother appliance operates the ringer so as to start a telephone calling operation. At the same time, the mother appliance returns a telephone communication starting acceptance to the child appliance.

In this case, the child appliance issues a multi-link permitting request for inquiring as to whether or not a plurality of wireless links are permitted to be established. When the empty of the own wireless resource is larger than the threshold value with respect to the multi-link permitting request, the mother appliance returns a multi-link permitting response to the child appliance. At the time when the user responds on the side of the mother appliance, the mother appliance returns a response notification to the child appliance side, and thus, voice paths of both the mother appliance and the child appliance are operated so as to commence a voice communication operation.

In order to establish a second wireless link, the child appliance subsequently issues a link establishing request in such a slot which is not used in the first wireless link, and accepts a link allocation from the mother appliance, so that the child appliance establishes the second wireless link, and transmits/receives voice data in the two (first and second) wireless links. As previously explained, the voice communication operation is once commenced in one wireless link, and in a half way thereof, the process operation for establishing the second wireless link is commenced.

In this embodiment, the second wireless link is established after the voice communication is commenced. There is an alternative case. That is, after the multi-link permitting notification has been accepted from the mother appliance, the child appliance may commence such an operation for establishing the second wireless link without waiting for the response notification. When the child appliance accepts the multi-link permitting notification, the timing at which the child appliance initiates the second wireless link may be alternatively set to any time instant until the communication operation is ended.

In such a case that the mother appliance does not permit the establishments of the plural wireless links with respect to the multi-link permitting request due to such a reason that there no empty of the own wireless resource, or the mother appliance does not own the multi-link function, this mother appliance returns a multi-link not-permitting response instead of the multi-link permitting response. Also, in the case that the mother appliance does not permit the plural wireless links, there is another method that since the mother appliance does not return the multi-link permitting response, this mother appliance may not permit the plural wireless links with respect to the child appliance. In this case, another method may be alternatively carried out. That is, at such a time instant when the wireless resource of the mother appliance becomes empty so that the mother appliance can permit a plurality of wireless links, the mother appliance may return the multi-link permitting response with response to the child appliance. After this time instance, the present operation of the child appliance maybe advanced to such an operation that the second wireless link is established.

Figure 8:
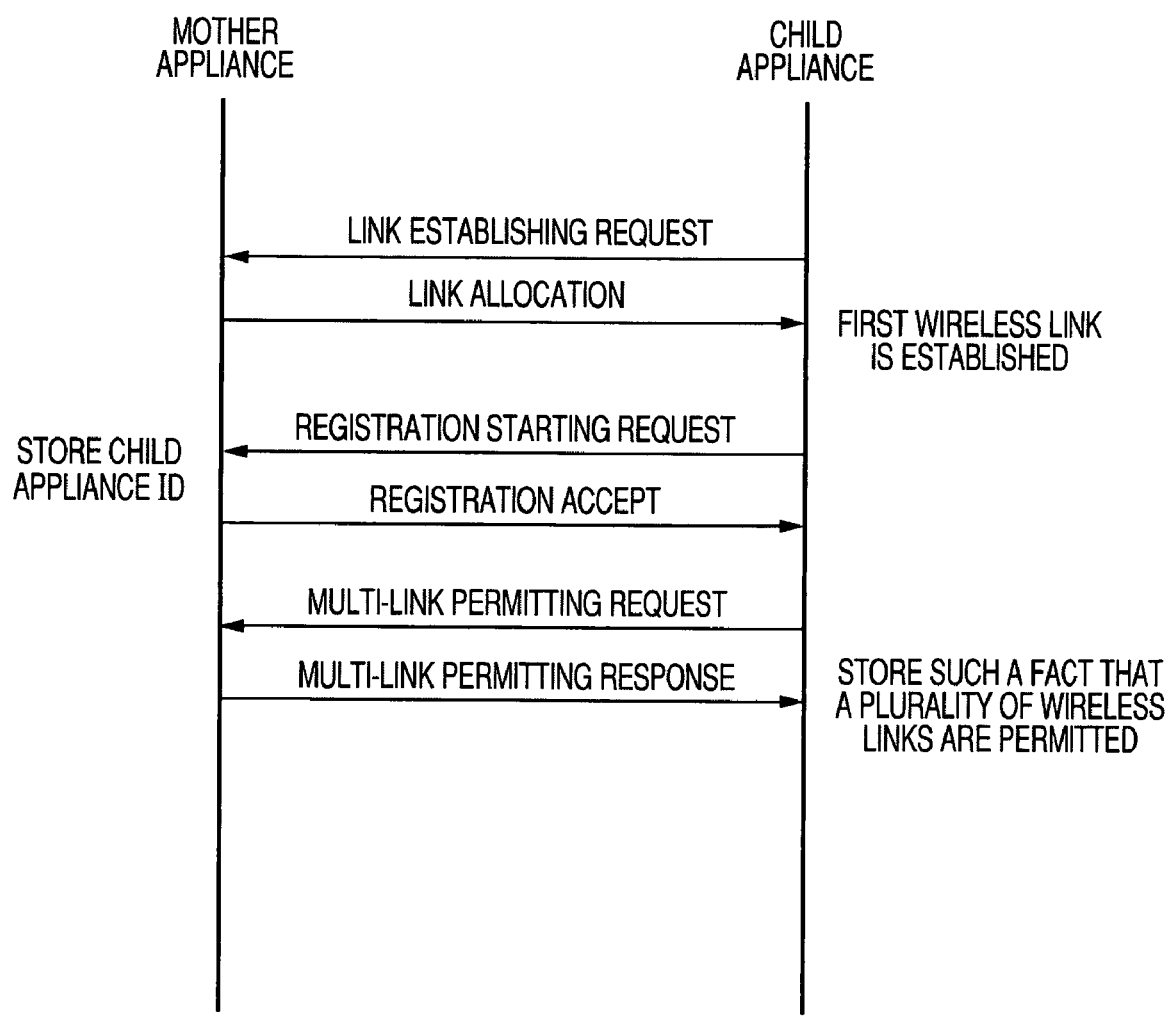
FIG. 8 is a sequence diagram for explaining notifications of permitting/not permitting wireless links between the mother appliance and the child appliance during registration operation.

FIG. 8 indicates a sequential operation executed between the mother appliance and the child appliance by which permission/non-permission of a wireless link are notified during a registering operation, especially represents an example of such a case that a plurality of wireless links are permitted. When the power supply is turned ON on the side of the child appliance, or the child appliance is moved to another base station area in a public system, so that a registering operation is commenced, the registering operation is initiated. When the registering operation is initiated, a link allocating request is issued from the child appliance, and a link application is accepted from the mother appliance, so that a wireless link is established. Subsequently, the child appliance issues a registration starting request, and then, when the mother appliance accepts the registration starting request, the mother appliance stores thereinto a code which is contained in the registration starting request and is used to identify the child appliance, for instance, stores thereinto a child appliance ID, and then, returns a registration acceptance to the child appliance. The child appliance issues a multi-link permitting request for inquiring as to whether or not the child appliance is permitted to establish a plurality of wireless links.

In the case that the mother appliance permits a plurality of wireless links with respect to the multi-link permitting request, the mother appliance returns a multi-link permitting response to the child appliance. Also, in the case that the mother appliance prohibits a plurality of wireless links with respect to the multi-link permitting request, the mother appliance returns a multi-link not-permitting response to the child appliance. The child appliance stores thereinto permission/non-permission condition, and subsequently, determines as to whether or such an operation for establishing a plurality of wireless links are established is carried out in accordance with the stores content when this child appliance is communicated to the relevant mother appliance. In this example, such a notification as to whether or not the mother appliance permits the plural wireless links is made in response to the multi-link permitting request and the response thereof from the child appliance. Alternatively, as explained in the method for notifying the permission/non-permission condition to the child appliance as a portion of the registration accepting information from the mother appliance, there is another method. That is, the mother appliance may notify the permission/non-permission condition without receiving a request issued from the child appliance by using a portion of such information which is transmitted/received between the mother appliance and the child appliance during the registering operation.

Next, such an operation is explained in which a plurality of wireless links are permitted/not permitted by way of an operation of a user. An arrangement of a wireless communication apparatus of this explanation is similar to that of the wireless communication apparatus of FIG. 1. In FIG. 1, in the case that the user switches to permit/or not permit a plurality of wireless links, this user enters a permission/non-permission command by using the operation unit 107. The control unit stores the entered command. In the subsequent communication operation, the control unit determines as to whether or not such an operation for establishing a plurality of wireless links is carried out in response to the stored information, namely, the permission/non-permission condition. It should also be noted that this function may be realized in any one of the mother appliance and the child appliance.

In the case that the mother appliance is set to the non-permission condition, this setting condition becomes effective in the communications established between this mother appliance and all of the child appliances which are communicated to this mother appliance, and thus, the communications made by the plural wireless links can be set to be not permitted. Also, when the child appliance is set to the non-permission condition, if the mother appliance is set under permission condition, then the communication made by only this child appliance by using the plural wireless links is prohibited. This setting operation maybe probably utilized so as to achieve the following objects. That is to say, while the battery energy of the relevant child appliance is lowered, the communication by using the plural wireless links is temporarily prohibited so as to suppress the consumption of this battery; and when the wireless conditions between the mother appliance and the respective child appliances are different from each other depending upon the installation conditions, in such a case that the wireless condition is deteriorated, for instance, such an apparatus which may constitute an interference source of a wireless communication between the mother appliance and a certain child appliance is installed near this child appliance, only this child appliance is permitted and further other child appliances are not permitted. As a result, the wireless resources may be effectively utilized, and a total number of simultaneous telephone communications established between the mother appliance and the child appliances may be increased.

Alternatively, another method may be carried out, in which as to setting of permission/non-permission condition, either the transmission from the mother appliance to the child appliance or the transmission from the child appliance to the mother appliance may be independently set. For instance, when the transmission from the child appliance to the mother appliance is not permitted, in such a case that a second wireless link subsequent to a first wireless link is established, only a transmission from the mother appliance is carried out in the second wireless link. It should be noted that as to the transmission required to establish the second wireless link, for example, a wireless link establishing request issued from the child appliance is transmitted even under prohibit condition. After a wireless link of a dual direction has been established, the transmission from the child appliance to the mother appliance might be stopped. As previously explained, when the permission/non-permission condition are set, either the transmission from the child appliance to the mother appliance or the transmission from the mother appliance to the child appliance is independently set. As a result, for example, in such a case that such an apparatus which may constitute an interference source of a wireless communication between the mother appliance and a certain child appliance is installed near this mother appliance, only up direction is permitted. As a result, the wireless resources may be effectively utilized, and the reception quality of the mother appliance may be improved. Since only the down direction is permitted, it is possible to suppress the battery energy consumption of the child appliance which is driven by this battery.

In this example, the second wireless link is established after the voice communication is commenced. There is an alternative case. That is, after the multi-link permitting notification has been accepted from the mother appliance, the child appliance may commence such an operation for establishing the second wireless link without waiting for the response notification. When the child appliance accepts the multi-link permitting notification, the timing at which the child appliance initiates the second wireless link may be alternatively set to any time instant until the communication operation is ended.

In such a case that the mother appliance does not permit the establishments of the plural wireless links with respect to the multi-link permitting request due to such a reason that there no empty of the own wireless resource, or the mother appliance does not own the multi-link function, this mother appliance returns a multi-link not-permitting response instead of the multi-link permitting response. Also, in the case that the mother appliance does not permit the plural wireless links, there is another method that since the mother appliance does not return the multi-link permitting response, this mother appliance may not permit the plural wireless links with respect to the child appliance. In this case, another method may be alternatively carried out. That is, at such a time instant when the wireless resource of the mother appliance becomes empty so that the mother appliance can permit a plurality of wireless links, the mother appliance may return the multi-link permitting response with response to the child appliance. After this time instance, the present operation of the child appliance may be advanced to such an operation that the second wireless link is established.

Also, a description is made of another operation example in which a plurality of wireless links are permitted/not permitted. In the wireless communication apparatus, both a voice communication and a data communication such as transfer operation of telephone directory data are carried out. In the case of the data communication, a temporary wireless failure does not give a demerit to a user, as compared with the voice communication. In other words, in the case of the data communication, even when a wireless failure happens to occur. Since lost data is resent under resending control operation, the transmission as to all of these data can be guaranteed. The data communication can be carried out while the user does not become aware of such a fact that the wireless failure more or less occurs.

As a consequence, in the wireless communication apparatus having both the voice communication function and the data communication function, according to the present invention, such a condition as to whether or not a plurality of wireless links are permitted can be switched based upon either the voice communication operation or the data communication operation. For instance, the following method may be alternatively carried out. That is, in the case that only the voice communication operation is allowed and the data communication is not allowed, or in such a case that the permission/non-permission conditions of the plural wireless links are switched based upon the empty condition of the wireless resources, such a control operation is carried out in such a manner that a threshold value for not permitting the plural wireless links in the case of the voice communication operation is made smaller than a threshold value for not permitting the plural wireless links in the case of the data communication operation. Then, when the voice communication operation is carried out, the plural wireless links may be easily permitted. Apparently, a method capable of determining the switching operation for permitting/not permitting the plural wireless links in the voice communication operation and the data communication operation may be similarly realized based upon the user operation, as explained above.

EMBODIMENT MODE 2

Figure 9A:
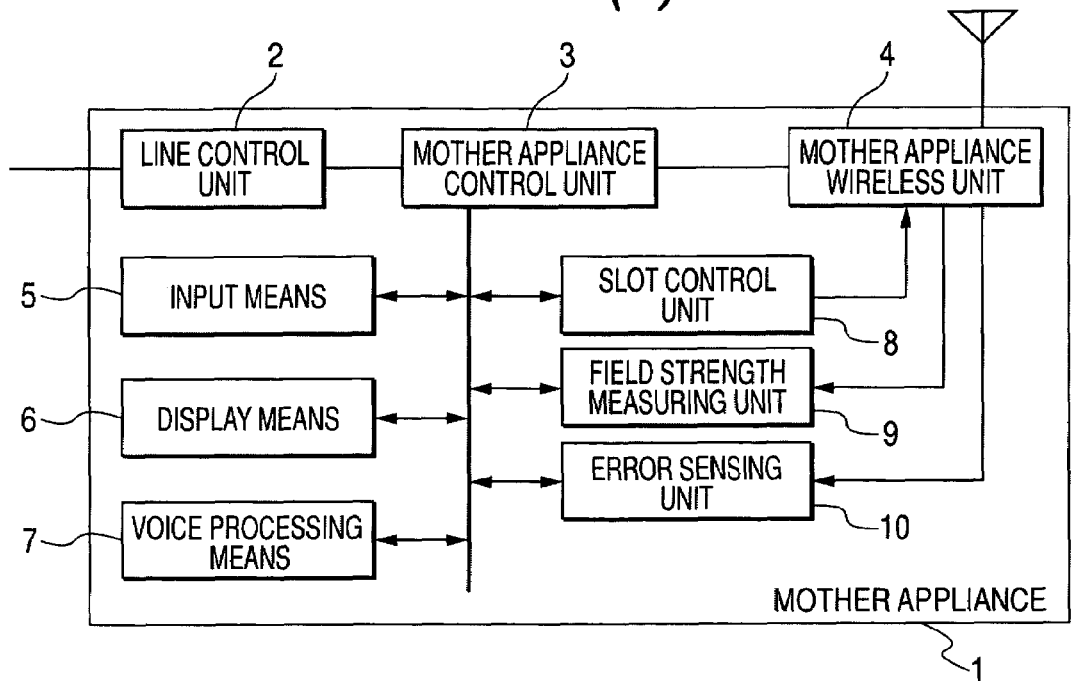
FIG. 9(a) is a structural diagram of a mother appliance of a slot diversity adaptable wireless communication system according to an embodiment mode 2 of the present invention.
Figure 9B:
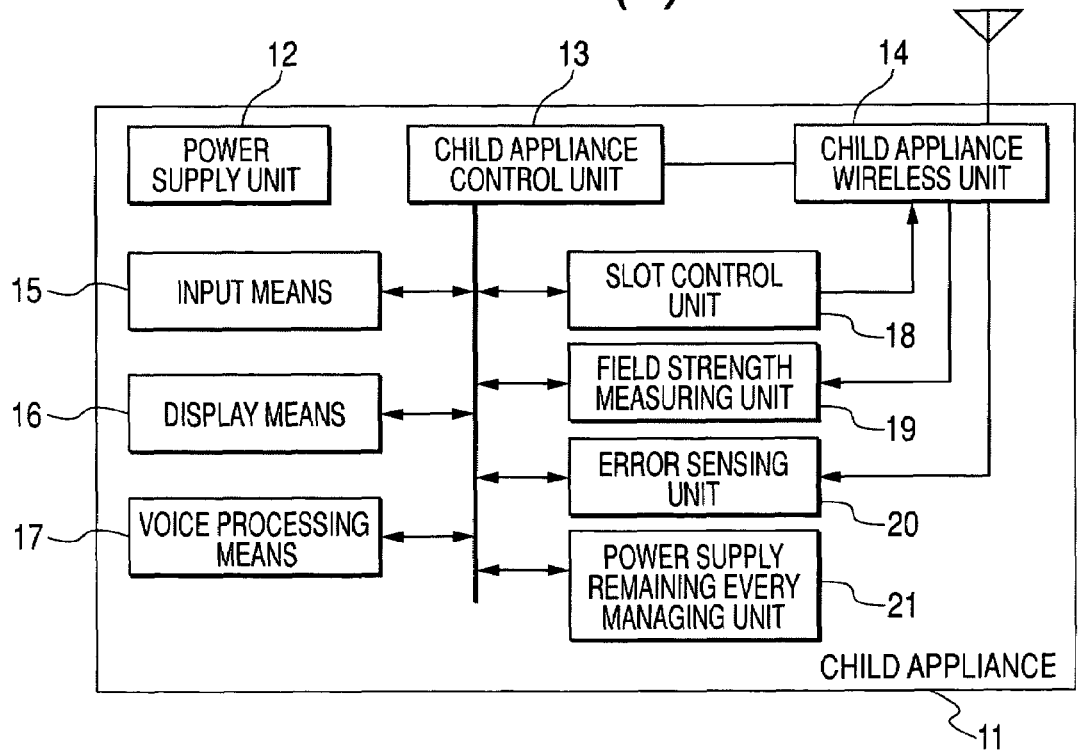
FIG. 9(b) is a structural diagram of a child appliance of the slot diversity adaptable wireless communication system according to the embodiment mode 2.

FIG. 9(a) is a structural diagram of one communication apparatus (mother appliance) employed in a wireless communication system according to an embodiment mode 2 of the present invention, and FIG. 9(b) is a structural diagram of the other communication apparatus (child appliance) which constitutes a communication counter party of the first-mentioned one communication apparatus (mother appliance) in the wireless communication system. It should be noted that one communication apparatus will be referred to as a "mother appliance", whereas the other communication apparatus will be referred to as a "child appliance."

First, an arrangement of the mother appliance will now be explained. In FIG. 9(a), reference numeral 1 indicates a mother appliance; reference numeral 2 shows a line control unit of the mother appliance, which controls a public line; reference numeral 3 represent a mother appliance control unit for controlling an entire unit of the mother appliance, for example, for establishing and releasing a wireless connection, and for performing a quality control; reference numeral 4 shows a mother appliance wireless unit for transmitting/receiving data within a wireless section; and reference numeral 5 indicates an input means such as a ten-numeral entry key, which can input a telephone number. Also, reference numeral 6 shows a display means; reference numeral 7 indicates a voice processing means which is connected to a microphone, or a speaker, and A/D-converts a voice signal into a digital voice signal; reference numeral 8 represents a slot control unit for controlling a slot used in a wireless communication; reference numeral 9 shows a field strength measuring unit which measures a (electric) field strength of a slot received from the mother appliance wireless unit 4, and then informs the measured field strength to the mother appliance control unit 3; and reference numeral 10 indicates an error sensing unit which executes an error monitoring operation of data of a slot received from the mother appliance wireless unit 4, and then informs the error monitoring information to the mother appliance control unit 3.

Subsequently, an arrangement of the child appliance will now be explained. In FIG. 9(b), reference numeral 11 shows the child appliance; reference numeral 12 indicates a power supply unit of the child appliance 11; reference numeral 13 represents a child appliance control unit for controlling an entire unit of the child appliance, for example, for establishing and releasing a wireless connection, and for performing a quality control; reference numeral 14 shows a child appliance wireless unit for transmitting/receiving data within a wireless section; and reference numeral 15 indicates an input means such as a ten-numeral entry key, which can input a telephone number. Also, reference numeral 16 shows a display means; reference numeral 17 indicates a voice processing means which is connected to a microphone, or a speaker, and A/D-converts a voice signal into a digital voice signal; reference numeral 18 represents a slot control unit for controlling a slot used in a wireless communication; reference numeral 19 shows a field strength measuring unit which measures a (electric) field strength of a slot received from the child appliance wireless unit 14, and then informs the measured field strength to the child appliance control unit 13; and reference numeral 20 indicates an error sensing unit which executes an error monitoring operation of data of a slot received from the child appliance wireless unit 14, and then informs the error monitoring information to the child appliance control unit 13; and further, reference numeral 21 indicates a power supply remaining energy managing unit for managing remaining energy of the power supply unit 12.

Now, a description is made of the wireless communication system of FIG. 9 according to this embodiment mode 2. That is, in a time division multiple access-time division duplex (TDMA-TDD) type wireless communication system, the mother appliance 1 transmits a wireless signal which has been modulated by the same transmission data determined between the child appliance 11 and the mother appliance 1 via the mother appliance wireless unit 4 to the child appliance 11, while "B" pieces of slot quantities within the same frame and slot numbers determined with respect to the child appliance 11 are set from the mother appliance control unit 3 to the slot control unit 8. Symbol "B" is a natural number larger than, or equal to 2 and smaller than, or equal to N (symbol "N" denotes natural number larger than, or equal to 4). In the above-described TDMA-TDD type wireless communication system, while a frame having a predetermined constant time is equally subdivided into "N" pieces of slots, both a transmission signal and a reception signal are multiplexed in each of the equally-divided time slots, and then, the multiplex communication operation is carried out between the mother appliance 1 and the child appliance 11.

The child appliance 11 sets to the slot control unit 18, both "Ba" pieces of slot quantities and slot numbers thereof which are actually received and have been set by the child appliance control unit 13 within "B" pieces of the time slots within the same frame transmitted from the mother appliance 1, and receives via the child appliance control unit 13. Also, the child appliance 11 similarly transmits a wireless signal via the child appliance wireless unit 14, which has been modulated by the same transmission data and is determined with respect to the mother appliance 1, while "Pa" pieces of slot quantities and slot numbers thereof are set to the slot control unit 18, which have been set by the child appliance control unit 13 and are actually transmitted among "P" pieces of slots within the same frame. Symbol "P" denotes a natural number layer than, or equal to 2, and smaller than, or equal to (N–B).

The mother appliance 1 sets both "P" pieces of slot quantities within the same frame transmitted from the child appliance 11 and the slot numbers which have been determined between the mother appliance 1 and the child appliance 11 from the mother appliance control unit 3 to the slot control unit 8, and receives via the mother appliance wireless unit 4.

In this case, for example, when "P" is not equal to "Pa", the mother appliance 1 executes reception operations plural times equal to "P" pieces of the slots. However, since the child appliance 11 transmits only "Pa" pieces of the slots, the mother appliance 1 cannot receive a wireless signal in slots, the quantity of which is equal to a difference between Pa and P, and thus, can sense an error.

As one example of the slot diversity in this embodiment mode 2, a description is made of contents indicated in a slot diversity operation example of FIG. 10. A total slot quantity per 1 frame is equal to 8, slot numbers "0" to "3" are allocated to transmission-purpose slots from the side of the mother appliance 1, and slot numbers "4" to "7" are allocated to transmission-purpose slots from the side of the child appliance.

Among these slot numbers, the slot number "0" is used as a slot which is used to notify control information containing broadcast information from the mother appliance 1 to the child appliance 11, and also, the slot number information. The mother control unit 3 sets the above-described "B" as 2 and the above-explained "P" as 2 with respect to the slot control unit 8. In the child appliance 11, the child control unit 13 sets the above-explained "B" as 2 and the above-described "P" as 2 with respect to the slot control unit 18, and furthermore, sets the above-described "Ba" as 2, and the above-explained "Pa" as 1. Under such a setting condition, the wireless signal is transmitted from the mother appliance 1 to the child appliance 11 by using two slots having the slot numbers "2" and "3" which have been set between the mother appliance 1 and the child appliance 11, whereas since "Pa" has been set as 1 by the child appliance control unit 13 in the child appliance 11, the wireless signal is transmitted from the child appliance 11 by employing one slot having the slot number "6" within the slot numbers "6" and "7" which have been set between the child appliance 11 and the mother appliance 1. If the above-explained "Pa" is set as 2, then the wireless signal is transmitted from the child appliance 11 to the mother appliance 1 even in the slot having the slot number "7."

As to a signal process operation executed on the side of such an appliance which receives a plurality of slots, various methods may be alternatively selected, for instance, data of such a slot having no error is selected; and although data of the latest slot is continuously employed unless an error occurs, data of such a slot where an error occurs is discarded.

TABLE 2

TRANSITION EXAMPLE OF SLOT DIVERSITY MODE CONDITION DUE TO POWER SUPPLY USABLE CAPACITY OF CHILD APPLIANCE

| POWER SUPPLY USABLE CAPACITY | SLOT DIVERSITY MODE |
|---|---|
| LARGE TO MEDIUM | FIXED MODE |
| SMALL | TRANSMISSION VARIABLE MODE (TRANSMISSION/RECEPTION VARIABLE MODE) |
| VERY SMALL | OFF MODE |

Next, a description is made of such an example as to transitions of slot diversity mode conditions due to differences in power supply usable capacities of the child appliance 11, which is indicated in a table 2. In this table 2, the child appliance 11 may have the below-mentioned four modes: That is, the following four modes are conceivable:

1) a slot diversity fixed mode;
2) a slot diversity transmission variable mode;
3) a slot diversity transmission/reception variable mode; and
4) a slot diversity OFF mode.

1) In the slot diversity fixed mode, a wireless signal which has been modulated by the same transmission data determined between the mother appliance 1 and the child appliance 11 is transmitted by employing "B" pieces of the slot quantities within the same frame, and while actually received slot quantity "Ba" is the same, the slot quantity "Pa" by which the wireless signal is actually transmitted is equal to the slot quantity "P" among "P" pieces of the slots within the same frame, which has been modulated by the same transmission data determined between the child appliance 11 and the mother appliance 1.

2) In the slot diversity transmission variable mode, a wireless signal is transmitted to the mother appliance 1 in the slot diversity fixed mode by employing a plurality of slot quantities larger than, or equal 1, and smaller than "P".

3) In the slot diversity transmission/reception variable modes, a wireless signal is actually received from the mother appliance 1 in the slot diversity transmission variable mode by employing a plurality of slot numbers larger than, or equal to 1, and smaller than "B."

4) In the slot diversity OFF mode, both the slot quantities "Pa" and "Ba" in the slot diversity transmission/reception variable mode are fixed to 1. It should also be noted that among these four modes, an arbitrarily selected number of modes may be installed on the child appliance 11 in accordance with a required specification.

In the child appliance 11, a power supply usable capacity is sequentially informed to the child appliance control unit 13 from the power supply remaining energy managing unit 21 which manages the power supply usable capacities of the power supply unit 12. As a result, in the case that the child appliance control unit 13 judges a necessity of a mode change, the child appliance control unit 13 requests the slot control unit 18 to execute a slot changing process operation.

The example of this table 2 corresponds to such a condition transition: In the case that the power supply usable capacity is large to medium, the fixed mode is selected in which although the power consumption becomes maximum, the maximum wireless quality can be secured; in the case that the power supply usable capacity becomes small, the transmission variable mode is selected; and in the case that the power supply usable capacity remains small, the OFF mode is selected. As a result, while the power consumption is minimum, the sufficiently longer communication time may be secured. In such a case that the transmission/reception variable mode is mounted on the child appliance 11, the transmission variable mode may be replaced by the transmission/reception variable mode. It should also be noted that in the example of this table 2, the slot diversity transmission/reception variable mode within the above-described 4 modes is not mounted.

TABLE 3

TRANSITION EXAMPLE OF SLOT DIVERSITY MODE CONDITION DUE TO BY CHILD APPLIANCE

| ELECTRIC FIELD STRENGTH | SLOT DIVERSITY MODE |
|---|---|
| HIGH | TRANSMISSION VARIABLE MODE |
| LOW | FIXED MODE |

Next, a description is made of such an example as to transitions of slot diversity mode conditions due to electric field strengths received by the child appliance 11, shown in a table 3. A wireless signal transmitted from the mother appliance 1 is received by the child wireless unit 14 of the child appliance 11, an electric field strength of this received wireless signal is measured by the field strength measuring unit 19, and then, the measured field strength is sent to the child appliance control unit 13 so as to be judged. As a result of this judgement, when a mode change is required, the child appliance control unit 13 requires the slot control unit 18 to execute a slot changing process operation.

In the example of this table 3, in such a case that the field strength to the slot control unit 18 is under high strength condition, the child control unit 13 judges that a distance between the mother appliance 1 and the child appliance 11 is short, and thus, sets the transmission variable mode, whereas in such a case that the field strength to the slot control unit 18 is under low strength condition, the child control unit 13 judges that a distance between the mother appliance 1 and the child appliance 11 is long, and thus, switches the transmission variable mode into the fixed mode.

TABLE 4

TRANSITION EXAMPLE OF SLOT DIVERSITY MODE CONDITION DUE TO ERROR OCCURRENCE FREQUENCY OF SIGNAL RECEIVED BY CHILD APPLIANCE

| ERROR OCCURRENCE FREQUENCY | SLOT DIVERSITY MODE |
|---|---|
| HIGH TO MEDIUM | FIXED MODE |
| LOW | TRANSMISSION VARIABLE MODE |

Next, a description is made of such an example as to transitions of slot diversity mode conditions due to error occurrence frequencies of signals received by the child appliance 11, shown in a table 4. A wireless signal transmitted from the mother appliance 1 is received by the child appliance wireless unit 14 of the child appliance 11, the error sensing unit 20 judges as to whether or not the received wireless signal contains an error, and then, a judgement result is sent to the child appliance control unit 13. At this time, in such a case that the child appliance control unit 13 judges a mode change based upon such a judging basis, for example, a total number of continued errors, or a total error number per unit time, the child appliance control unit 13 requests the slot control unit 18 to execute a slot changing process operation. In the example of the table 4, when the error occurrence frequency is high, or medium due to some interference, the child appliance control unit 13 sets the fixing mode. Conversely, in such a case that substantially no interference occurs and the error occurrence frequency is small, the child appliance control unit 13 switches the fixing mode into the transmission variable mode.

TABLE 5

TRANSITION EXAMPLE OF SLOT DIVERSITY MODE CONDITION DUE TO POWER SUPPLY USABLE CAPACITY OF CHILD APPLIANCE, AND ELECTRIC FIELD STRENGTH

| POWER SUPPLY USABLE CAPACITY | ELECTRIC FIELD STRENGTH | |
|---|---|---|
| | HIGH | LOW |
| LARGE TO MEDIUM | TRANSMISSION VARIABLE MODE | FIXED MODE |
| SMALL | TRANSMISSION VARIABLE MODE | FIXED MODE |
| VERY SMALL | OFF MODE | OFF MODE |

Next, a description is made of such an example as to transitions of slot diversity mode conditions due to power supply usable capacities and electric field strengths received by the child appliance 11, represented in a table 5. This corresponds to such a child appliance 11 which owns the two functions as explained in the table 2 as to the transitions of the slot diversity mode conditions due to the differences in the power supply usable capacities of the child appliance, and also, in the table 3 as to the transitions of the slot diversity mode conditions due to the electric field strengths received by the child appliance 11.

In the example of this table 5, in such a case that the child appliance control unit 13 judges that an electric field condition of a wireless signal measured by the field strength measuring unit 19 is under high condition, when the power supply usable capacities are large to medium and small, which are informed from the power supply remaining energy managing unit 21 of the power supply unit 12 to the child appliance control unit 13, the child appliance control unit 13 of the child appliance 11 sets the transmission variable mode. When the power supply usable capacity is very small, the child appliance 11 requests the slot control unit 18 to switch the transmission variable mode into the OFF mode in order that while the electric power consumption is minimized, the communication time may be secured as long as possible.

Conversely, in such a case that the child appliance control unit 13 judges that an electric field condition of a wireless signal measured by the field strength measuring unit 19 is under low condition, when the power supply usable capacities are large to medium and small, which are informed from the power supply remaining energy managing unit 21 of the power supply unit 12 to the child appliance control unit 13, the child appliance control unit 13 of the child appliance 11 sets the transmission fixed mode. When the power supply usable capacity is very small, the child appliance 11 requests the slot control unit 18 to switch the transmission fixed mode into the OFF mode in order that while the electric power consumption is minimized, the communication time may be secured as long as possible.

TABLE 6

TRANSITION EXAMPLE OF SLOT DIVERSITY MODE CONDITION DUE TO POWER SUPPLY USABLE CAPACITY OF CHILD APPLIANCE, AND ERROR OCCURRENCE FREQUENCY OF RECEPTION SIGNAL

| | ERROR OCCURRENCE FREQUENCY | |
| --- | --- | --- |
| POWER SUPPLY USABLE CAPACITY | HIGH TO MEDIUM | LOW |
| LARGE TO MEDIUM | FIXED MODE | TRANSMISSION VARIABLE MODE |
| SMALL | FIXED MODE | TRANSMISSION VARIABLE MODE |
| VERY SMALL | OFF MODE | OFF MODE |

Next, a description is made of such an example as to transitions of slot diversity mode conditions due to power supply usable capacities of the child appliance 11, and error occurrence frequencies of reception signals represented in a table 6. This corresponds to such a child appliance 11 which owns the two functions as explained in the table 2 as to the transitions of the slot diversity mode conditions due to the differences in the power supply usable capacities of the child appliance 11, and also in the table 4 as to the transitions of the slot diversity mode conditions due to the error occurrence frequencies of the signals received by the child appliance 11.

In the example of this table 6, while the error sensing unit 20 judges as to whether or not the wireless signal contains an error, in such a case that the child appliance control unit 13 judges that the error occurrence frequencies are under high to medium conditions, when the power supply usable capacities are large to medium and small, which are informed from the power supply remaining energy managing unit 21 of the power supply unit 12 to the child appliance control unit 13, the child appliance control unit 13 of the child appliance 11 sets the transmission fixed mode. When the power supply usable capacity is very small, the child appliance 11 requests the slot control unit 18 to switch the transmission fixed mode into the OFF mode in order that while the electric power consumption is minimized, the communication time may be secured as long as possible.

Conversely, in such a case that the child appliance control unit 13 judges that the error occurrence frequencies are under low condition, when the power supply usable capacities are large to medium and small, which are informed from the power supply remaining energy managing unit 21 of the power supply unit 12 to the child appliance control unit 13, the child appliance control unit 13 of the child appliance 11 sets the transmission variable mode. When the power supply usable capacity is very small, the child appliance 11 requests the slot control unit 18 to switch the transmission variable mode into the OFF mode in order that while the electric power consumption is minimized, the communication time may be secured s long as possible.

TABLE 7

TRANSITION EXAMPLE OF SLOT DIVERSITY MODE CONDITION DUE TO ELECTRIC FIELD STRENGTH OF CHILD APPLIANCE, AND ERROR OCCURRENCE FREQUENCY OF RECEPTION SIGNAL

| | ERROR OCCURRENCE FREQUENCY | |
| --- | --- | --- |
| ELECTRIC FIELD STRENGTH | HIGH TO MEDIUM | LOW |
| HIGH | FIXED MODE | OFF MODE |
| LOW | FIXED MODE | FIXED MODE |

Next, a description is made of such an example as to transitions of slot diversity mode conditions due to electric field strengths received by the child appliance 11, and error occurrence frequencies of reception signals represented in a table 7. This corresponds to such a child appliance 11 which owns the two functions as explained in the table 3 as to the transitions of the slot diversity mode conditions due to the received field strengths, of the child appliance 11, and also in the table 4 as to the transitions of the slot diversity mode conditions due to the error occurrence frequencies of the signals received by the child appliance 11.

In the example of this table 7, while the error sensing unit 20 judges as to whether or not the wireless signal contains an error, in such a case that the child appliance control unit 13 judges that the error occurrence frequencies are under high to medium conditions, the child appliance control unit 13 requests the slot control unit 18 to set the fixed mode even when the condition of the wireless signal measured by the field strength measuring unit 19 is brought into any field strength condition.

Conversely, in such a case that the child appliance control unit 13 judges that the error occurrence frequencies are under low condition, when the child appliance control unit 13 judges that the electric field strength of the wireless signal measured by the field strength measuring unit 19 is high, the child appliance control unit 13 sets the OFF mode, whereas when the child appliance control unit 13 judges that the electric field strength of the wireless signal measured by the field strength measuring unit 19 is low, the child appliance control unit 13 requests the slot control unit 18 to switch the OFF mode into the fixed mode.

TABLE 8

Transition example of slot diversity mode condition due to power supply usable capacity of child appliance, electric field strength and, error occurrence frequency of reception signal

| POWER SUPPLY USABLE CAPACITY | ELECTRIC FIELD STRENGTH | | | |
|---|---|---|---|---|
| | HIGH | HIGH | LOW | LOW |
| | ERROR OCCURRENCE FREQUENCY | | | |
| | HIGH TO MEDIUM | LOW | HIGH TO MEDIUM | LOW |
| LARGE TO MEDIUM | FIXED MODE | TRANSMISSION VARIABLE MODE | FIXED MODE | FIXED MODE |
| SMALL | FIXED MODE | TRANSMISSION VARIABLE MODE | FIXED MODE | FIXED MODE |
| VERY SMALL | OFF MODE | OFF MODE | OFF MODE | OFF MODE |

Next, a description is made of such an example as to transitions of slot diversity mode conditions due to power supply usable capacities, electric field strengths received by the child appliance 11, and error occurrence frequencies of reception signals, represented in a table 8. This corresponds to such a child appliance 11 which owns the two functions as explained in the table 5 as to the transitions of the slot diversity mode conditions due to the electric field strengths and the power supply usable capacities of the child appliance 11, and also in the table 4 as to the transitions of the slot diversity mode conditions due to the error occurrence frequencies of the signals received by the child appliance 11.

In the example of this table 8, in such a case that the child appliance control unit 13 judges that an electric field condition of a wireless signal measured by the field strength measuring unit 19 is under high condition, and furthermore, the error sensing unit 20 judges as to whether or not the wireless signal contains an error, and thus, the child appliance control unit 13 judges that the error occurrence frequencies are under high to medium conditions, when the power supply usable capacities are large to medium and small, which are informed from the power supply remaining energy managing unit 21 of the power supply unit 12 to the child appliance control unit 13, the child appliance control unit 13 of the child appliance 11 sets the fixed mode. When the power supply usable capacity is very small, the child appliance 11 requests the slot control unit 18 to switch the fixed mode into the OFF mode in order that while the electric power consumption is minimized, the communication time may be secured as long as possible.

Also, in such a case that the child appliance control unit 13 similarly judges that the electric field strength is under high condition, and also judges that the error occurrence frequency is under low condition, when the power supply usable capacities are large to medium and small, which are informed from the power supply remaining energy managing unit 21 of the power supply unit 12 to the child appliance control unit 13, the child appliance control unit 13 of the child appliance 11 sets the transmission variable mode. When the power supply usable capacity is very small, the child appliance 11 requests the slot control unit 18 to switch the transmission variable mode into the OFF mode in order that while the electric power consumption is minimized, the communication time may be secured as long as possible.

Subsequently, in such a case that the child appliance control unit 13 judges that the electric field strength is under low condition, and further, the error sensing unit 20 judges as to whether or not the wireless signal contains an error, and thus, the child appliance control unit 13 judges that the error occurrence frequencies are under high to medium conditions, when the power supply usable capacities are large to medium and small, which are informed from the power supply remaining energy managing unit 21 of the power supply unit 12 to the child appliance control unit 13, the child appliance control unit 13 of the child appliance 11 sets the fixed mode. When the power supply usable capacity is very small, the child appliance 11 requests the slot control unit 18 to switch the fixed mode into the OFF mode in order that while the electric power consumption is minimized, the communication time may be secured as long as possible.

Finally, in such a case that the child appliance control unit 13 similarly judges that the electric field strength is under low condition, and also judges that the error occurrence frequency is under low condition, when the power supply usable capacities are large to medium and small, which are informed from the power supply remaining energy managing unit 21 of the power supply unit 12 to the to the child appliance control unit 13, the child appliance control unit 13 of the child appliance 11 sets the fixed mode. When the power supply usable capacity is very small, the child appliance 11 requests the slot control unit 18 to switch the fixed mode into the OFF mode in order that while the electric power consumption is minimized, the communication time may be secured as long as possible.

In the foregoing descriptions, the child appliance control unit 13 has switched the modes with respect to the slot control unit 18 based upon the power supply remaining capacity, the received field strength, and the error occurrence frequency of the child appliance 11. Alternatively, the user of the child appliance 11 may forcibly switch the modes by employing the input means 15 based upon the own judging policy of this user in combination with the above-described judging conditions.

An important point of the above-explained wireless communication system of the embodiment mode 2 is given as follows: That is, in order that the transmission/reception slot quantities of the slot diversity are continuously maintained to the above-described "B" and "P" irrespective of the above-explained values of "Pa" and "Ba" of the child appliance 11, the mother appliance 1 completely pays no attention to such a fact that the child appliance 11 has installed which mode, or this child appliance 11 is presently operated in which mode. As a consequence, the connections between the mother appliance 1 and the plural child appliances 11 which perform the communications in the various modes can be readily realized.

As previously explained, in accordance with the slot diversity adaptable communication system of the present invention, while the power supply remaining capacity of the child appliance and the electromagnetic wave environments are considered, the slot diversity mode having the more effective result is selected and the wireless communication quality can be improved.

EMBODIMENT MODE 3

Next, another embodiment mode 3 of the present invention will now be explained. That is, a plurality of frequencies used in the same frame are combined with each other, which can be hardly adversely influenced by a fading characteristic of transmission paths, and also by electromagnetic wave interference.

Figure 11:
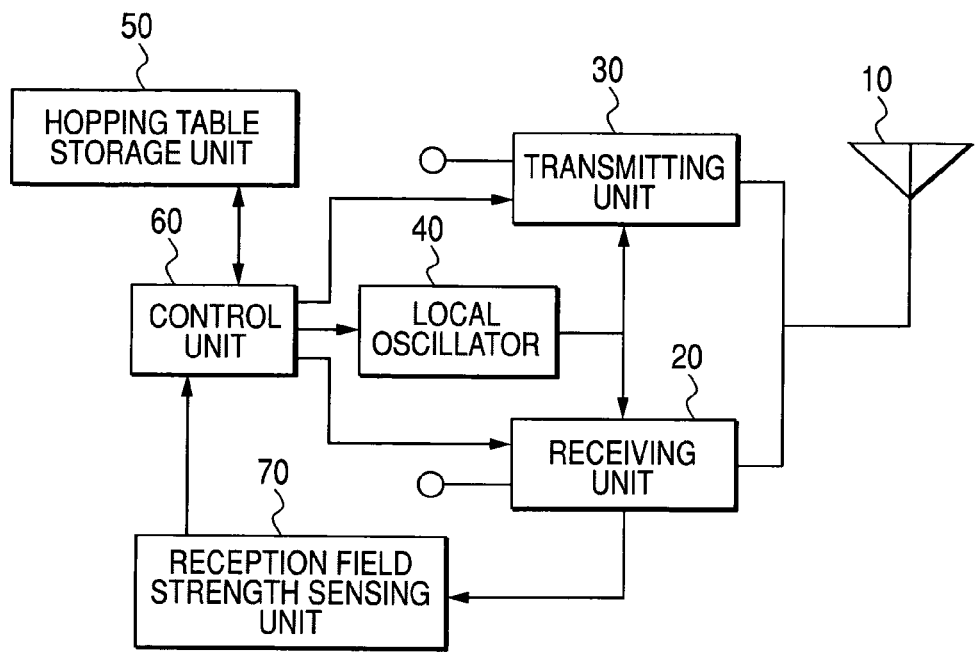
FIG. 11 is a block diagram of a wireless communication apparatus according to an embodiment mode 3 of the present invention.

FIG. 11 is a block diagram for indicating an arrangement of a frequency hopping type, time division multiplex (TDMA-TDD) type communication apparatus according to this embodiment mode 3. In this drawing, an antenna 10 transmits/receives a wireless signal. A receiving unit 20 demodulates the received wireless signal. The transmitting unit 30 transmits a wireless signal which is produced from a transfer signal. A local oscillator 40 produces a local oscillation signal which is required so as to transmit/receive the wireless signal. A frequency hopping pattern storage unit 50 stores thereinto combinations between frequencies which hop every frame and frequencies which are employed in a plurality of slots of each frame. A control unit 60 outputs a control signal for transmitting/receiving in a predetermined slot of a communication frame, outputs frequency data which is read out from the frequency hopping pattern storage unit 50, and manages a reception field strength every channel, and also, selects frequencies which are combined with each other. A reception field strength sensing unit 70 detects a reception level of a wireless signal received by the receiving unit 20, and outputs a signal in response to the detected reception level.

Figure 12:
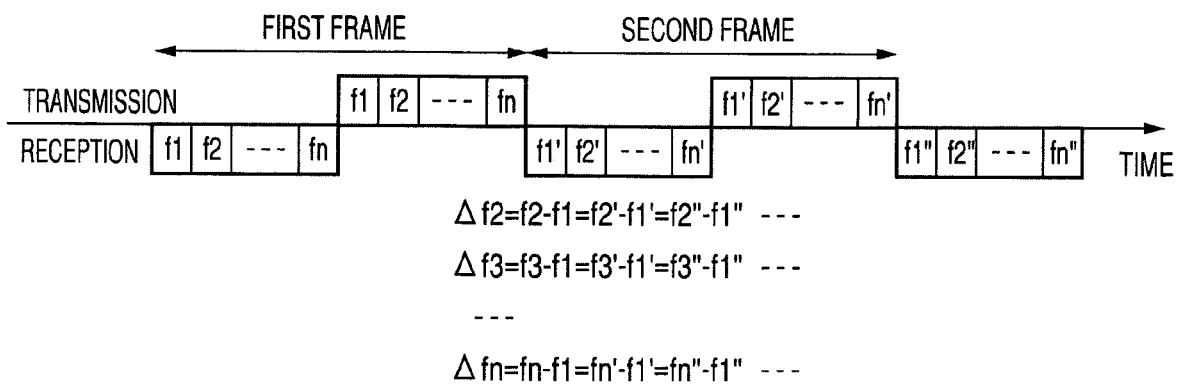
FIG. 12 is a diagram for representing a TDMA-TDD communication frame of the present invention.

FIG. 12 represents a frequency frame of this wireless communication system. As indicated in this drawing, such a TDMA-TDD system is constructed that while a plurality of frequencies within the same frame are employed so as to transmit/receive wireless signals, the frequencies hop every frame. Wireless signals which are produced from transfer signals of the respective frames have been divided into a plurality of frequencies, and then, the subdivided frequencies have been superimposed on the respective slots of the respective frequencies. Since one of these slots whose reception condition is better is selected from these plural slots, the frequency diversity effect may be achieved.

While a plurality of frequencies are employed within the same frame, in such a case that since any of the frequencies under better reception conditions is selected, the frequency diversity is carried out, several methods for determining the plural frequencies used in this frequency diversity will now be exemplified.

EXAMPLE 1

Figure 13:
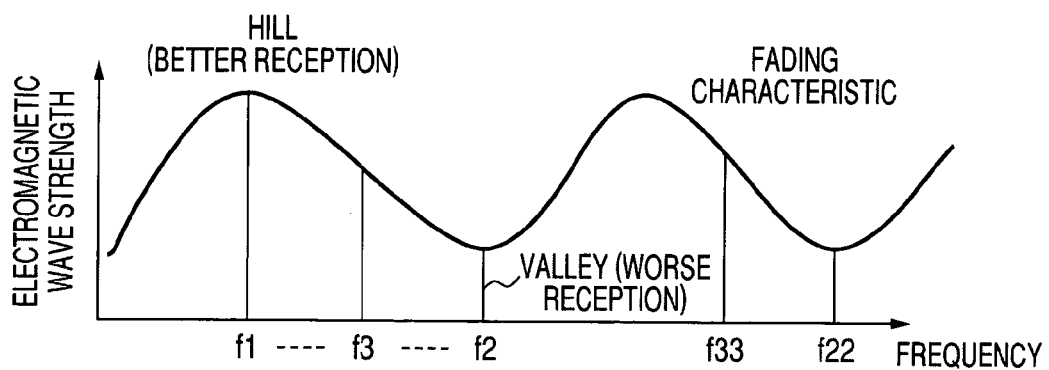
FIG. 13 is a diagram for indicating an example of a frequency characteristic as to a fading phenomenon in a transmission path.

A first example 1 is a method for determining frequencies in such a manner that as to combinations of frequencies of the plural slots which are transmitted within the same frame in the frequency hopping type time division multiplex (TDMA-TDD) wireless system constitute such frequency combinations having low correlative characteristics with respect to the fading characteristic of the wireless propagation paths. FIG. 13 indicates this frequency determining method. That is, the frequencies which are employed in the same frame are sequentially determined as "f1", "f2", and "f3" in the order of lower correlative characteristics of field strength levels with respect to such a fading characteristic which has been previously predicted based upon the conditions of the wireless propagation paths, or has been actually measured. Since there are plural hills and valleys of the fading phenomenon, plural sets of these combinations are also present. For instance, in this drawing, frequencies of f1, f22, f33 may be combined with each other. If a plurality of frequencies within the same frame are combined with each other, then combinations of frequencies in frames subsequent to the first-mentioned frame may be similarly determined by employing these frequency intervals as a basic idea. In other words, with respect to previously determined hopping frequencies f1, f1', f1", - - - , such frequencies may be determined as f2−f1=f2'−f1'=f2"−f1" - - - , f3−f1=f3−f1'=f3"−f1" - - - in order to become the same frequency intervals. As a consequence, even in succeeding frames, frequencies having low correlative characteristics may be combined with each other with respect to the fading phenomenon, so that the stable frequency diversity effects can be continuously achieved.

EXAMPLE 2

An example 2 for determining frequencies is such a method. That is, in the above-described example 1, while tow slots is employed in the same frame, such a combination of f1 and f2 are selected which owns a frequency relationship that the respective frequencies become a hill and a valley in the fading characteristic. If a combination of two frequencies within the same frame is determined, then frequency intervals in frames subsequent to this frame may be determined by employing this frequency combination as a basic idea. In other words, with respect to previously determined hopping frequencies f1, f1', f1", - - - , such frequencies may be selected so as to become the same frequency interval as f2−f1=f2'−f1"=f2"−f1" - - - . As a consequence, even in succeeding frames, frequencies having low correlative characteristics may be combined with each other with respect to the fading phenomenon, so that the stable frequency diversity effects can be achieved.

EXAMPLE 3

Figure 14:
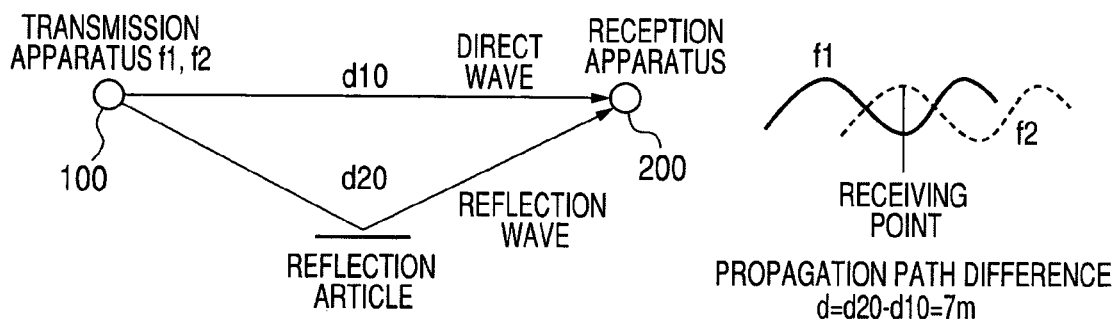
FIG. 14 is a diagram for showing a fading example made of direct waves and reflection waves.

An example 3 for determining frequencies is such a method. That is, in the above-described example 1, while two slots are employed in the same frame, combinations of respective frequencies are selected in such a manner that a relationship "$(\lambda 1-\lambda 2) \times d/\lambda 1$" of each of frequencies may become most close to "$\lambda 1/4 \times M$ (symbol "M" being odd number). It should be noted that symbol "d" indicates a path difference between two major waves which form a fading phenomenon. This may be calculated from a previously predicted condition of the propagation paths in such a manner that two frequencies to be used may establish a hill/valley relationship of a fading characteristic. FIG. 14 indicates a concrete example of this frequency determining method. In this concrete example, such a case is assumed that a propagation path difference "d" of two waves, namely, a direct wave and a reflection wave is equal to 7 m. In such a wireless communication system that a used frequency range is 2.4 GHz, f1=2.4 GHz, and a channel interval=1 MHz, the frequency "f2" which can satisfy the above-described relationship and may constitute the most close frequency combination may become equal to 2.411 GHz (M=1) which is separated therefrom by 11 MHz. Since symbol "M" is the odd number, such frequencies separated from 33 MHz and 55 MHz may be selected, while M=3 and 5. If the combination between the two frequencies within the same frame is determined, then frequency intervals in frames subsequent to the first-mentioned frame may be determined by employing this value as a basic idea. In other words, with respect to previously determined hopping frequencies f1, f1', f1", - - -, such frequencies may be selected so as to become the same frequency interval as f2−f1=f2'−f1'==f2"−f1" - - - -. As a consequence, even in succeeding frames, frequencies having low correlative characteristics may be combined with each other with respect to the fading phenomenon, so that the stable frequency diversity effects can be achieved.

EXAMPLE 4

An example 4 for determining frequencies is such a method that in the above-described example 3, a range for combining the frequencies is enlarged to such a range defined by "λ1/4× M±1/8." If the frequency combination range of "±λ1/8" is employed, then the frequencies having the low correlative relationship with respect to the fading characteristic can be combined with each other. As a result, the above-explained diversity effect may be achieved.

EMBODIMENT MODE 4

Next, a wireless communication apparatus according to an embodiment mode 4 will now be explained. That is, in such a wireless communication apparatus that a control-purpose signal is transmitted from one wireless communication apparatus in a periodic manner during a waiting operation, and the other wireless communication apparatus receives the above-explained control-purpose signal during a waiting operation, a frequency used during a communication operation is determined based upon a reception field strength of each of channels which are received in a periodic manner during the waiting condition.

In such a case that characteristics of wireless propagation paths are made complex and fading characteristics can be hardly grasped, such frequencies having low correlative relationships are selected based upon electric field strengths of the respective channels which have been actually measured. During the waiting operation, the reception field strength sensing unit 70 detects a reception level of a wireless control signal transmitted from a transmitting appliance of the communication counter party, which is received by the receiving unit 20, and then, notifies the detected reception level to the control unit 60. While the control unit 60 manages the notified reception levels every channel, this control unit 60 determines combinations of frequencies based upon high/low level relationships, for instance, a maximum value, a minimum value, and an intermediate value in a similar manner to that of the above-described embodiment mode 1. If an interval among the combined frequencies is determined, then the subsequent operations and effects are completely same as those of the embodiment mode 1.

Alternatively, in such a wireless communication apparatus that a control-purpose signal is transmitted from one wireless communication apparatus in a periodic manner during a waiting operation, and the other wireless communication apparatus receives the above-explained control-purpose signal during a waiting operation, the wireless communication apparatus may select a combination between a frequency having the highest reception field strength and another frequency having the lowest reception field strength based upon the reception field strengths of the control-purpose reception signals which have been received during the waiting operation.

Embodiment Mode 5

Next, a wireless communication apparatus according to an embodiment mode 5 will now be explained. That is, in such a wireless communication apparatus that a control-purpose signal is transmitted from one wireless communication apparatus in a periodic manner during a waiting operation, and the other wireless communication apparatus receives the above-explained control-purpose signal during a waiting operation, the wireless communication apparatus may select both a predetermined number of first frequency groups from frequencies having the highest reception field strengths, and a predetermined number of second frequency groups from frequencies having the lowest reception field strengths based upon the reception field strengths of the control-purpose reception signals which have been received during the waiting operation. Then, the wireless communication apparatus may select one frequency from the first frequency groups and the second frequency groups, respectively. This embodiment mode 5 corresponds to such an embodiment mode that while both the maximum value and the maximum value obtained in the above-explained embodiment mode 4 are widened, combinations of frequencies which are selected as the first frequency group and the second frequency group may be enlarged. A total number of these frequencies which may constitute this width may be set within such a range that the frequency diversity effect may be achieved, and may be previously stored in the control unit 60.

EMBODIMENT MODE 6

Next, a wireless communication apparatus according to an embodiment mode 6 will now be explained. That is, in such a wireless communication apparatus that a control-purpose signal is transmitted from one wireless communication apparatus in a periodic manner during a waiting operation, and the other wireless communication apparatus receives the above-explained control-purpose signal during a waiting operation, the wireless communication apparatus may select both a predetermined number of first frequency groups from frequencies having the highest reception field strengths, and a predetermined number of second frequency groups from frequencies having the lowest reception field strengths based upon the reception field strengths of the control-purpose reception signals which have been received during the waiting operation. Then, the wireless communication apparatus may alternatively select a combination of such frequencies whose difference becomes the largest value, from the first frequency groups and the second frequency groups, respectively. This frequency selecting method is carried out as follows. That is, in the above-described embodiment mode 5, one frequency is selected from each of the first frequency groups and the second frequency groups, which have been acquired, in such a manner that the frequency difference thereof becomes maximum. This frequency selecting method is effective in the case that other electric appliances are located in the frequency band under use and causes electromagnetic wave interference with respect to the above-described wireless communication apparatus. More specifically, as to wireless electronic appliances using the spread spectrum system, there are large possibilities that these wireless electronic appliances cannot receive wireless signals, since the occupied frequency bands thereof are widened, and if the frequency differences are made narrow, then any selected frequencies may cause interference with each other. As a consequence, such a selecting operation for widening differences of the selected frequencies may give a merit with respect to interference withstanding characteristics.

Also, in the above-explained embodiment modes, in the case that the frequencies are determined based upon the reception field strengths, when the reception error occurs, a value of a reception field strength in this slot is invalidated. As a result, such a confusion can be avoided. That is, in such a case that there is another electronic appliance which uses the same frequency band, the reception error is caused by either the fading phenomenon or the mutual interference by this electronic appliance, resulting in the confusion. In other words, when the reception error occurs, it is so assumed that the used frequency is adversely influenced by interference of another electronic appliance, the field strength of the frequency in this slot is void.

EMBODIMENT MODE 7

Figure 15:
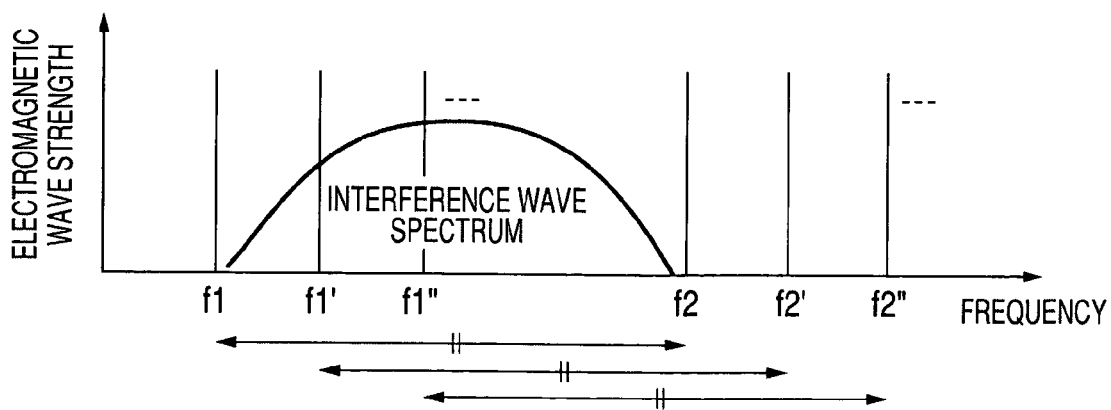
FIG. 15 is a diagram for indicating a spectrum example which constitutes disturbances given from other electronic appliances.
Figure 16:
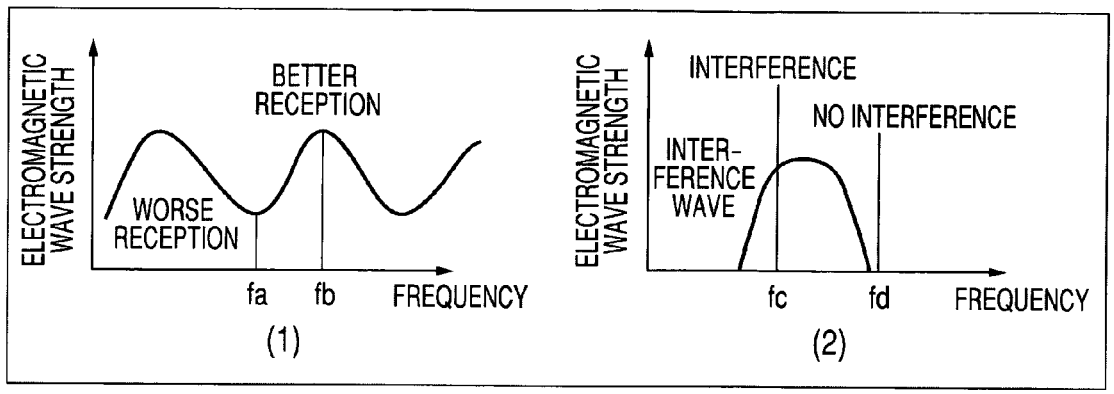
FIG. 16(1) is a diagram for indicating adverse influences given to communications by the fading effects, and FIG. 16(2) is a diagram for representing adverse influences given to communications by the disturbance waves.
Figure 17:
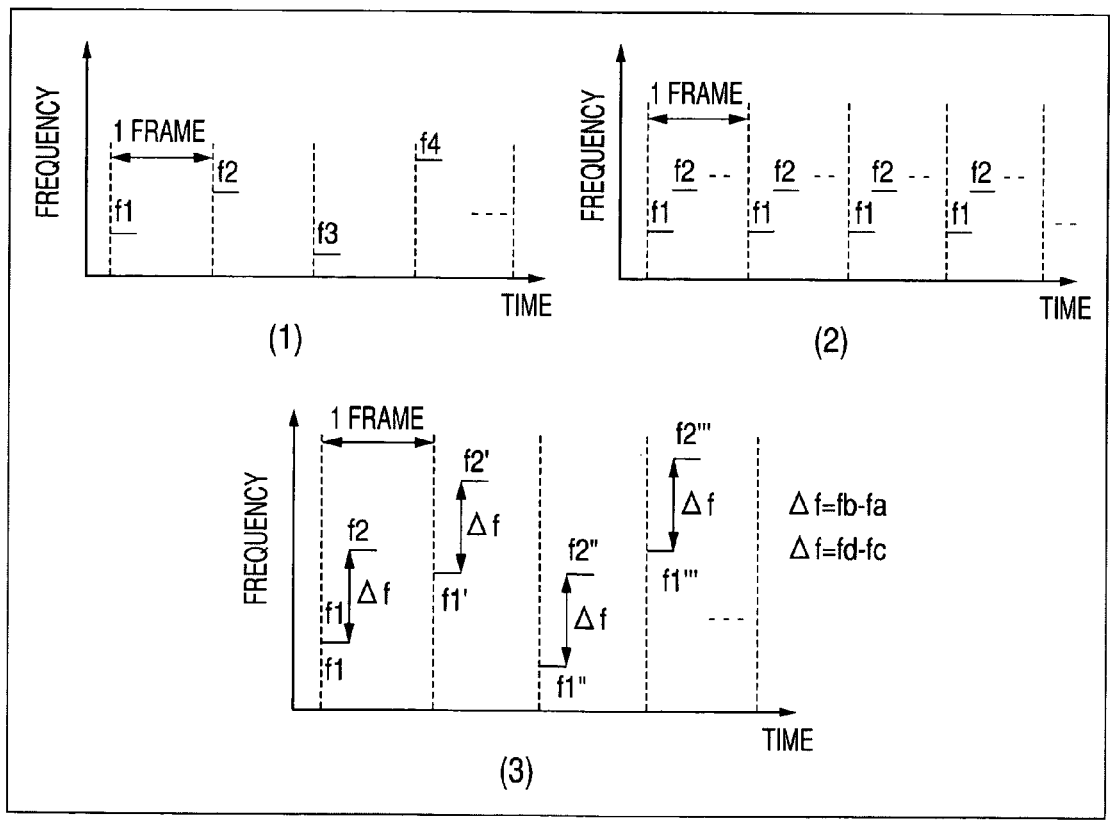
FIG. 17(1) is a diagram for showing an improvement achieved by frequency hopping, FIG. 17(2) is a diagram for indicating an improvement achieved by a plurality of frequencies, and FIG. 17(3) is a diagram for showing an improvement achieved by combined frequencies, according to the present invention.

An embodiment mode 7 of the present invention is to determine frequencies which are used within the same frame and own such a frequency difference higher than, or equal to a predetermined frequency. As shown in FIG. 15, in such a case that there is another electronic appliance which use the same frequency band, since a difference between frequencies is made wider than an occupied bandwidth of this electronic appliance, at least one of the two frequencies is not adversely influenced by interference. Such a wireless communication system using the ISM (industrial chemical medial purpose) band at the frequency of 2.4 GHz will now be described as a typical example. Since various sorts of electronic appliances such as microwave ovens and wireless LANs are used in this frequency band of 2.4 GHz, electromagnetic interference may easily occur in this frequency band. In particular, recently, since wireless LANs have been considerably popularized, specific cares must be necessarily taken in wireless electronic appliances using this frequency band with respect to occurrences of mutual interference caused by these wireless LANs. Since an occupied bandwidth of a wireless LAN is approximately 20 MHz, if such a frequency difference higher than, or equal to approximately 21 MHz is set, then at least one frequency may be escaped from this electromagnetic wave interference, and thus, a communication quality may be maintained.

On the other hand, as to such an interference given to wireless LANs, since this wireless communication system corresponds to the frequency hopping system, this interference may be basically mitigated. However, if a total number of slots to be transmitted and a total number of hopping frequencies are increased, interference probability is also increased. As a result, it is not preferable to transmit a wireless signal by employing two slots. As a consequence, while the frequency hopping method is applied only to the reception side as to one wireless apparatus of this wireless communication system, if a wireless signal is transmitted by using such a frequency which may cause a better reception condition, then the giving interference can be mitigated while the frequency diversity effect with respect to the given interference may be substantially equivalently maintained. Since this method for applying the frequency hopping only to the reception side can suppress the operating time of the transmission side which requires large power consumption to a half operating time, this method may become very effective means in the case that one wireless appliance is driven by a battery.

Alternatively, while frequencies used within the same frame are determined to have such a frequency difference higher than, or equal to a predetermined frequency, two sets of frequencies may be selected in such a manner that both a condition for electromagnetic wave interference and the respective conditions of the present invention with respect to the fading effects can be satisfied. As a result, the interference with respect to other electronic appliances using the same frequency band can be avoided, and at the same time, the frequency diversity effect with respect to the fading phenomenon can be achieved.

It should be noted that in the above-described embodiment modes, the frequencies to be combined with each other have been selected based upon the electric field strengths acquired during the waiting operation. Alternatively, if the frequencies to be adaptively combined with each other are selected based upon electric field strengths acquired during communication operation, then the adaptive type frequency diversity having more effective functions may be realized while the wireless communication apparatus is transported during operation.

As previously described in detail, in accordance with the present invention, the frequency diversity effect can be more effectively and more stably achieved with respect to the fading phenomenon of the wireless propagation paths and the electromagnetic interference caused by other electronic appliances which use the same frequency band.

What is claimed is:

1. A frequency hopping type wireless communication system in which a time division multiplexing operation is carried out, and a communication operation of the time-division-multiplexed communication signal is carried out while two, or more frequencies are switched between one communication counter party and the own wireless communication system, wherein:

a first communication apparatus transmits control-purpose information which constitutes a reference in either a regular manner or an irregular manner by employing at least one slot within plural slots in a predetermined frame period;

a second communication apparatus which constitutes a communication counter party of the first communication apparatus receives either a portion or all of the control-purpose information during a waiting operation, synchronizes timing of the frame and the slot with timing of the frequency hopping operation with respect to the first communication apparatus, and establishes a plurality of wireless links when the second communication apparatus commences a communication operation;

the first communication apparatus superimposes both a communication-purpose signal and the control-purpose information used between both the first and second communication apparatus on one slot so as to establish a wireless link; and the second communication apparatus transmits the communication-purpose signal with respect to the first communication apparatus, while using only one wireless link selected from the plurality of wireless links in response to an environmental condition.

2. The wireless communication system according to claim 1, wherein:

the wireless communication system is further comprised of:

a controller, controlling the wireless communication system in such a manner that when the first and second wireless communication apparatus are communicated to each other, in such a case that the plurality of wireless links are established, the wireless links are established in a plurality of slots other than a control slot used to transmit the control-purpose information; and the control-purpose information is superimposed on the slots of the established wireless links.

3. The wireless communication system according to claim 1 wherein:
after the first wireless link has been established in the first communication apparatus, a communication signal to the second communication apparatus is superimposed on the control slot.

4. A frequency hopping type wireless communication system in which a time division multiplexing operation is carried out by subdividing a time period every predetermined time and by subdividing a time period within a frame every the predetermined time, and a communication operation is carried out in the time division multiplexing manner, while 2, or more frequencies are switched with respect to one wireless link; wherein:
a first communication apparatus and a second communication apparatus which constitutes a communication counter party of the first communication apparatus are capable of establishing a wireless link by superimposing control-purpose information on a communication-purpose signal for both the first and second communication apparatus, and establish at least one wireless link during a communication operation, and are capable of selecting a demodulation signal in such a wireless link whose communication quality is better to execute the communication operation;
the first communication apparatus is comprised of:
transmission means for transmitting control-purpose information containing control information for notifying as to whether or not a plurality of wireless links can be established in either a regular manner or an irregular manner;
the second communication apparatus which constitutes the communication counter party of the first communication apparatus is comprised of:
reception means for receiving the control-purpose information;
the second communication apparatus notifies as to whether or not a plurality of wireless links can be established with respect to the control-purpose information transmitted from the first communication apparatus; and
the second communication apparatus controls to determine as to whether or not the second communication apparatus establishes a plurality of wireless links during the communication in response to it so as to execute a communication operation, or as to whether or not the second communication apparatus establishes one wireless link so as to execute a communication operation.

5. A frequency hopping type wireless communication system in which a time division multiplexing operation is carried out by subdividing a time period every predetermined time and by subdividing a time period within a frame every the predetermined time, and a communication operation is carried out in the time division multiplexing manner, while 2, or more frequencies are switched with respect to one wireless link; wherein:
a first communication apparatus and a second communication apparatus which constitutes a communication counter party of the first communication apparatus are capable of establishing a wireless link by superimposing control-purpose information on a communication-purpose signal for both the first and second communication apparatus, and establish at least one wireless link during a communication operation, and are capable of selecting a demodulation signal in such a wireless link whose communication quality is better to execute the communication operation;
the first communication apparatus is comprised of:
notification means for notifying as to whether or not the first communication apparatus permits to establish a plurality of wireless links by way of a wireless signal;
the second communication apparatus is comprised of:
inquiry means for inquiring as to whether or not the plurality of wireless links are permitted to be established by way of a wireless signal;
prior to a commencement of a communication operation, the second communication apparatus inquires the notification means from the inquiry means as to whether or not the wireless links are permitted to be established; in the case that the plurality of wireless links are permitted to be established in response to the notification result, the second communication apparatus is operated in such a manner that the plurality of wireless links are established; and in the case that the plurality of wireless links are not permitted to be established in response to the notification result, the second communication apparatus is operated in such a manner that only one wireless link is established.

6. A time division multiplex access (TDMA-TDD) type wireless communication system in which a frame having a predetermined constant time is equally subdivided into "N" (symbol "N" being natural number larger than, or equal to 4) pieces of time slots, and both a transmission signal and a reception signal are multiplexed by employing each of the equally-divided time slots, and then, a communication operation of the multiplexed transmission/reception signals is carried out between a first communication apparatus and a second communication apparatus, wherein:
the first communication apparatus is capable of transmitting a wireless signal which has been modulated by the same transmission data by using "B" (symbol "B" being natural number larger than, or equal to 2, and smaller than, or equal to "N") within the same frame with respect to the second communication apparatus;
the second communication apparatus is capable of transmitting a wireless signal which has been modulated by the same transmission data by employing "P" (symbol "P" being natural number larger than, or equal to 2, and smaller than, or equal to "N−B") within the same frame with respect to the first communication apparatus; and
in such a case that a slot number which has been actually received by the second communication apparatus is assumed as "Ba" among "B" pieces of slots by which the first communication apparatus has transmitted the wireless signal modulated based upon the same transmission data with respect to the second communication apparatus; and a communication slot number which is actually transmitted by the second communication apparatus is assumed as "Pa" among P pieces of slots by which the first communication apparatus is capable of transmitting a wireless signal modulated based upon the transmission data within the same frame with respect to the first communication apparatus,
the second communication apparatus owns any one, or a plurality of modes:
a slot diversity fixed mode in which the first communication apparatus transmits a wireless signal which has been modulated by the same transmission data determined between the first communication apparatus and the second communication apparatus and has been transmitted by employing "B" pieces of slots within the same frame, another wireless signal which has been modulated by the same data determined between the first communication apparatus and the second communication apparatus and has been transmitted by employing "Ba" pieces of actually received slots, and a slot quantity "Pa" for actually transmitting the wireless signal is equal to "P";

a slot diversity transmission variable mode in which a slot quantity "Pa" of a wireless signal to be transmitted to the first communication apparatus in the slot diversity fixed mode is larger than, or equal to 1, and smaller than "P"; and a slot diversity OFF mode in which both the slot quantities Pa and Ba are fixed to one.

7. The wireless communication system according to claim 6 wherein:
the second communication apparatus is further comprised of:
a slot diversity transmission/reception variable mode in which a slot quantity "Ba" of a wireless signal actually received from the first communication apparatus in the slot diversity transmission variable mode is larger than, or equal to 1, and smaller than "B".

8. The wireless communication system according to claim 6 wherein:
the second communication apparatus has a function capable of switching modes even under such a condition that the second communication apparatus and the first communication apparatus are moved to communication operations.

9. The wireless communication system according to claim 6, or claim 8 wherein:
the second communication apparatus exclusively determines a communication condition based upon a usable energy capacity of the power supply of the communication apparatus.

10. The wireless communication system according to claim 6 or claim 8 wherein:
the second communication apparatus measures an electric field strength of a wireless signal received by the first communication apparatus, and exclusively determines a communication condition based upon this measurement result.

11. The wireless communication system as claimed in claim 6, or claim 8 wherein:
the second communication apparatus exclusively determines a communication condition based upon a result of an error occurrence frequency of a wireless signal received from the first communication appliance.

12. The wireless communication system according to claim 6, or claim 8 wherein:
in the second communication apparatus, a mode can be forcibly switched by that a user himself manipulates a key irrespective of such a factor as a usable capacity of the power supply.

13. The wireless communication system according to claim 6 or claim 8 wherein:
a plurality of second communication apparatus having either one mode or a plurality of different modes can be communicated at the same time in a mode different from the mode of the same first communication apparatus, or in the same mode thereof.

14. A wireless communication system performing time division multiplexing operation using a plurality of slots in a frame, said wireless communication system comprising:
a first communication apparatus that transmits a control-purpose signal during at least one slot among the plurality of slots; and
a second communication apparatus that establishes, with the first communication apparatus, a plurality of wireless links respectively corresponding to the plurality of slots,
wherein the first communication apparatus transmits a first communication-purpose signal with the control-purpose signal during the at least one slot among the plurality of slots; and
wherein the second communication apparatus transmits a second communication-purpose signal to the first communication apparatus during only one slot corresponding to one link among the plurality of the established wireless links.

15. The wireless communication system according to claim 14, wherein:
the first communication apparatus moves, after the second communication apparatus establishes, with the first communication apparatus, the plurality of wireless links, a control slot into a slot among the plurality of slots corresponding to the plurality of wireless links, the control slot being used for the first communication-purpose signal.

16. A wireless communication system, said wireless communication system comprising:
a first communication apparatus; and
a second communication apparatus that communicates with the first communication apparatus using a time division multiplexing operation,
wherein the second communication apparatus establishes at least one wireless link with the first communication apparatus, and the first communication apparatus transmits both a communication-purpose signal and a control-purpose signal during one slot, and
wherein the first communication apparatus transmits to the second communication apparatus information on whether or not a plurality of wireless links can be established between the first communication apparatus and the second communication apparatus, and the second communication apparatus establishes a plurality of wireless links between the first communication apparatus and the second communication apparatus based on the information transmitted from the first communication apparatus.

* * * * *